US010608995B2

(12) United States Patent
Chou et al.

(10) Patent No.: US 10,608,995 B2
(45) Date of Patent: Mar. 31, 2020

(54) OPTIMIZING DATA TRANSFER COSTS FOR CLOUD-BASED SECURITY SERVICES

(71) Applicant: Nubeva, Inc., San Jose, CA (US)

(72) Inventors: Randy Yen-pang Chou, San Jose, CA (US); Greig W. Bannister, Allambie Heights (AU)

(73) Assignee: Nubeva, Inc., San Jose, CA (US)

( * ) Notice: Subject to any disclaimer, the term of this patent is extended or adjusted under 35 U.S.C. 154(b) by 335 days.

(21) Appl. No.: 15/842,848

(22) Filed: Dec. 14, 2017

(65) Prior Publication Data

US 2018/0115525 A1 Apr. 26, 2018

Related U.S. Application Data

(63) Continuation-in-part of application No. 15/792,679, filed on Oct. 24, 2017, now Pat. No. 10,419,394.

(60) Provisional application No. 62/412,171, filed on Oct. 24, 2016.

(51) Int. Cl.
  *H04L 29/06* (2006.01)
  *H04L 29/08* (2006.01)

(52) U.S. Cl.
  CPC ...... *H04L 63/0281* (2013.01); *H04L 63/1441* (2013.01); *H04L 67/2842* (2013.01); *H04L 63/0227* (2013.01); *H04L 63/0272* (2013.01); *H04L 67/1097* (2013.01)

(58) Field of Classification Search
  CPC ............. H04L 63/0281; H04L 63/0227; H04L 63/0428; H04L 63/0272; H04L 67/2842; H04L 67/1097
  USPC .......................................................... 726/1
  See application file for complete search history.

(56) References Cited

U.S. PATENT DOCUMENTS

| 7,131,141 B1 * | 10/2006 | Blewett ............... H04L 63/0209 726/12 |
| 8,127,291 B2 | 2/2012 | Pike et al. |
| 8,209,415 B2 | 6/2012 | Wei |
| 8,839,228 B2 | 9/2014 | Thorat et al. |

(Continued)

FOREIGN PATENT DOCUMENTS

WO  WO2017199062  5/2016

OTHER PUBLICATIONS

NPL Search Results (Year: 2019).*

(Continued)

*Primary Examiner* — Syed A Zaidi
(74) *Attorney, Agent, or Firm* — Mark Spiller

(57) ABSTRACT

The disclosed embodiments disclose techniques for optimizing data transfer costs for cloud-based security services. During operation, an intermediary computing device receives a network request from a client located in a remote enterprise location that is sending the network request to a distinct, untrusted remote site (e.g., a site separate from the distinct locations of the remote enterprise, the cloud data center, and the intermediary computing device). The intermediary computing device caches a set of data associated with the network request while forwarding the set of data to the cloud-based security service for analysis. Upon receiving a confirmation from the cloud-based security service that the set of data has been analyzed and is permitted to be transmitted to the specified destination, the intermediary computing device forwards the cached set of data to the specified destination.

15 Claims, 15 Drawing Sheets

(56) References Cited

U.S. PATENT DOCUMENTS

| | | | |
|---|---|---|---|
| 8,893,274 | B2 | 11/2014 | Zhu et al. |
| 8,909,928 | B2 | 12/2014 | Ahmad et al. |
| 9,286,134 | B2 | 3/2016 | Guo et al. |
| 9,294,443 | B2 | 3/2016 | Johnson et al. |
| 9,298,443 | B2 | 3/2016 | Dias De et al. |
| 9,356,886 | B2 | 5/2016 | Yang et al. |
| 9,411,621 | B2 | 8/2016 | Jeswani et al. |
| 9,473,472 | B1 | 10/2016 | Zhu et al. |
| 9,582,319 | B2 | 2/2017 | Ayala, Jr. et al. |
| 9,584,340 | B2 | 2/2017 | Liljenstolpe |
| 9,760,394 | B2 | 9/2017 | Liguori et al. |
| 2006/0092945 | A1* | 5/2006 | Hallmark ............... H04L 12/66 370/395.2 |
| 2011/0296520 | A1* | 12/2011 | Erofeev ............ H04L 63/0209 726/14 |
| 2015/0244712 | A1* | 8/2015 | Iwanski ............ H04L 63/0428 713/153 |
| 2015/0355923 | A1 | 12/2015 | Keller |
| 2015/0363219 | A1 | 12/2015 | Kasturi et al. |
| 2015/0381568 | A1* | 12/2015 | Johnson ............ H04L 63/0272 726/15 |
| 2016/0154659 | A9 | 6/2016 | Khalid |
| 2016/0261505 | A1 | 9/2016 | Saniee et al. |
| 2016/0378518 | A1 | 12/2016 | Antony et al. |
| 2017/0060609 | A1 | 3/2017 | Cropper et al. |
| 2017/0060628 | A1 | 3/2017 | Tarasuk-levin et al. |
| 2017/0063674 | A1 | 3/2017 | Maskalik et al. |
| 2017/0201490 | A1 | 7/2017 | Kinder et al. |

OTHER PUBLICATIONS

Liu, Feng, et al. "SaaS integration for software cloud." 2010 IEEE 3rd international conference on cloud computing. IEEE, 2010 (Year: 2010).*

* cited by examiner

OPTIMIZING DATA TRANSFER COSTS FOR CLOUD-BASED SECURITY SERVICES

RELATED APPLICATION

This application is a continuation-in-part of pending U.S. patent application Ser. No. 15/792,679, entitled "Providing Scalable Cloud-Based Security Services," by inventors Randy Yen-pang Chou and Greig W. Bannister and filed on 24 Oct. 2017, which is incorporated herein by reference. U.S. patent application Ser. No. 15/792,679 claims priority under 35 U.S.C. § 119(e) to U.S. Provisional Patent Application No. 62/412,171, by inventors Randy Yen-pang Chou and Greig W. Bannister, entitled "Providing Scalable Cloud-Based Security Services," filed 24 Oct. 2016. The contents of all of the above-referenced applications are hereby incorporated by reference.

BACKGROUND

Field of the Invention

This disclosure generally relates to techniques for providing flexible and extensible enterprise security systems. More specifically, this disclosure relates to techniques for enabling scalable cloud-based security services.

Related Art

Mobile devices, high-speed networks and cloud computing have led to distributed enterprise environments in which a majority of users work remotely from the company headquarters and access cloud-based applications. Unfortunately, traditional security practices that focus security resources primarily on securing the company headquarters are inadequate in such distributed environment. Providing distributed security services to an increasing number of distributed sites and individual mobile users involves significant challenges. For instance, some individual sites may not justify the expense of the desired security infrastructure. Furthermore, the set of security products and/or services that are installed at larger enterprise sites typically need to be updated frequently to counter constantly-evolving threats. However, as the number of sites and services grow, this update process is more likely to result in errors that can leave the enterprise vulnerable.

Hence, what is needed are techniques for providing enterprise security solutions without the above-described problems of existing techniques.

SUMMARY

The disclosed embodiments disclose techniques for optimizing data transfer costs for cloud-based security services. During operation, an intermediary computing device receives a network request from a client located in a remote enterprise location that is sending the network request to a distinct, untrusted remote site (e.g., a site separate from the distinct locations of the remote enterprise, the cloud data center, and the intermediary computing device). The intermediary computing device caches a set of data associated with the network request while forwarding the set of data to the cloud-based security service for analysis. Upon receiving a confirmation from the cloud-based security service that the set of data has been analyzed and is permitted to be transmitted to the specified destination, the intermediary computing device forwards the cached set of data to the specified destination.

In some embodiments, executing the cloud-based security service in the cloud data center provides a scalable and flexible security stack for the enterprise. However, a cost model for the cloud data center specifies that sending data out of the cloud data center is substantially more expensive than receiving data into the cloud data center. Because the confirmation is much smaller in size than the set of data, sending the set of data from the intermediary computing device to the specified destination incurs substantially lower data transfer costs than sending the set of data from the cloud data center to the specified destination, thereby allowing the cloud-based security service to leverage the advantages of the computing capabilities of the cloud computing environment while reducing the data transfer costs associated sending data from the cloud computing environment.

In some embodiments, the cloud-based security service comprises a dispatcher virtual machine (VM) that executes in the cloud data center and manages the flow of network traffic through a chain of multiple security service VMs that execute in the cloud data center and analyze the contents of network traffic to and from the clients. More specifically, each security service executes in its own separate VM. These VMs are then chained together so that the network request is serially processed by each security service in the chain in a specified order. These VMs are managed using multiple docker containers that execute as multi-tasking microservices within the dispatcher VM that execute in isolation of each other but can use operating system kernel resources to communicate with each other; each docker container is provided with an abstraction of its own process space and interfaces. The financial cost of cloud-based services is directly proportional to the number of VMs used, and executing microservices using dockers reduces the number of VMs needed to provide the cloud-based security service, thereby reducing the financial cost of providing the cloud-based security service.

In some embodiments, the dispatcher VM determines from the output of the chain of security service VMs whether a traffic flow that is being analyzed by the chain of security service VMs has been allowed or denied passage. The dispatcher VM is configured to notify the intermediary computing device of the results of the analysis so that the intermediary computing device can determine whether to forward the set of data to the specified destination or otherwise negatively flag and/or discard the set of data.

In some embodiments, the chain of security service VMs analyzes traffic flows and (1) passes through traffic flows that have been determined to be valid unchanged and (2) flags and/or discards traffic flows that have been determined to be invalid. For instance, the dispatcher VM may be configured to compare the output of the chain of security service VMs for the traffic flow with the original traffic flow (e.g. to determine if it has been changed) to determine whether the set of data should be forwarded to the specified destination.

In some embodiments, the dispatcher VM returns a hash value for an allowed set of data when indicating approval to the intermediary computing device. The dispatcher VM uses the hash value to confirm a match between the locally cached set of data and the allowed set of data, thereby ensuring that only the allowed set of data is forwarded to the specified destination. Note that the channel of communication between the dispatcher VM and the intermediary computing device may also need to be protected (e.g., encrypted)

to ensure that the intermediary computing device cannot be tricked by an external malicious party to send an unapproved set of data.

In some embodiments, the cloud computing environment provides scalable, flexible, and highly reliable computing capabilities that can perform a wide range of analysis upon traffic flows. In contrast, the intermediary computing device primarily caches and forwards traffic flows, and hence does not need the same level of scalability, flexibility, and reliability as the cloud computing environment and the cloud-based security service. Note that multiple, geographically-separated intermediary computing devices may be provisioned to ensure that access to the cloud-based security service in case a single intermediary computing device fails.

In some embodiments, the chain of security services includes one or more of a firewall service; an anti-virus service; an anti-malware service; an internet protocol filtering service; an intrusion detection service; a unified threat management service; a spam detection service; a packet filtering service; an application-specific analysis service; a data loss prevention service; and a traffic flow analysis service.

In some embodiments, data that is flowing both into and out of the remote enterprise location is analyzed by the cloud-based security service; e.g., the intermediary computing device is configured to cache ad forward all data that it receives from the remote enterprise location as well as all external data that it receives that is bound for the remote enterprise location to the cloud-based security service. The intermediary computing device is configured to only forward in either direction cached data that has been approved by the cloud-based security service.

In some embodiments, the network request is a URL that specifies data that the client is requesting from the untrusted remote site. The intermediary computing device caches the URL and forwards the URL to the cloud-based security service for analysis. The cloud-based security service analyzes and approves the URL, and the dispatcher VM forwards a confirmation to the intermediary computing device. The intermediary computing device then forwards the URL to the specified destination at the untrusted remote site. Upon receiving a set of return data associated with the URL from the untrusted remote site, the intermediary computing device caches the set of return data while forwarding the set of return data to the cloud-based security service for analysis. Finally, upon receiving confirmation that the set of return data has been analyzed and approved by the cloud-based security service, the intermediary computing device forwards the cached return set of data to the client that sent the original network request.

In some embodiments, the network request is a large file that the client is sending to the untrusted remote site. The intermediary caches the large file and forwards the large file to the cloud-based security service for analysis. The cloud-based security service analyzes and approves the network request, and the dispatcher VM forwards the confirmation to the intermediary computing device, which in turn forwards the large file to the specified destination of the untrusted remote site. Upon receiving a set of return data associated with the large file from the untrusted remote site, the intermediary computing device caches the set of return data while forwarding the set of return data to the cloud-based security service for analysis. Finally, upon receiving confirmation that the set of return data has been analyzed and approved by the cloud-based security service, the intermediary computing device forwards the cached return set of data to the client that sent the original network request.

In some embodiments, the network request is sent from the client in response to an earlier network request that was sent by the untrusted remote site (e.g., the interactions are initiated by the untrusted remote site). The earlier network request and the network request are both cached by the intermediary computing device and analyzed by the cloud-based security service before being permitted to be sent to their respective destinations In some embodiments, the intermediary computing device optimizes data transfers to reduce request latency by already forwarding the set of data to the specified destination in parallel with forwarding the set of data to the cloud-based security service for analysis, thereby allowing the requested data to already be retrieved while the request is being checked. The intermediary computing device then caches the return data from the specified destination until it receives the confirmation of the network request from the cloud-based security service, at which point it sends the cached set of return data to the cloud-based security service for analysis. Note that forwarding the set of data in parallel facilitates receiving and analyzing the network request and set of return data more quickly but is only safe when forwarding an unchecked initial set of data is not likely to represent a security threat or breach; for instance, such techniques might be more suitable for URL-based requests (as described above) than for sending a large file.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

Cloud-Based Security Services

Figure 1:
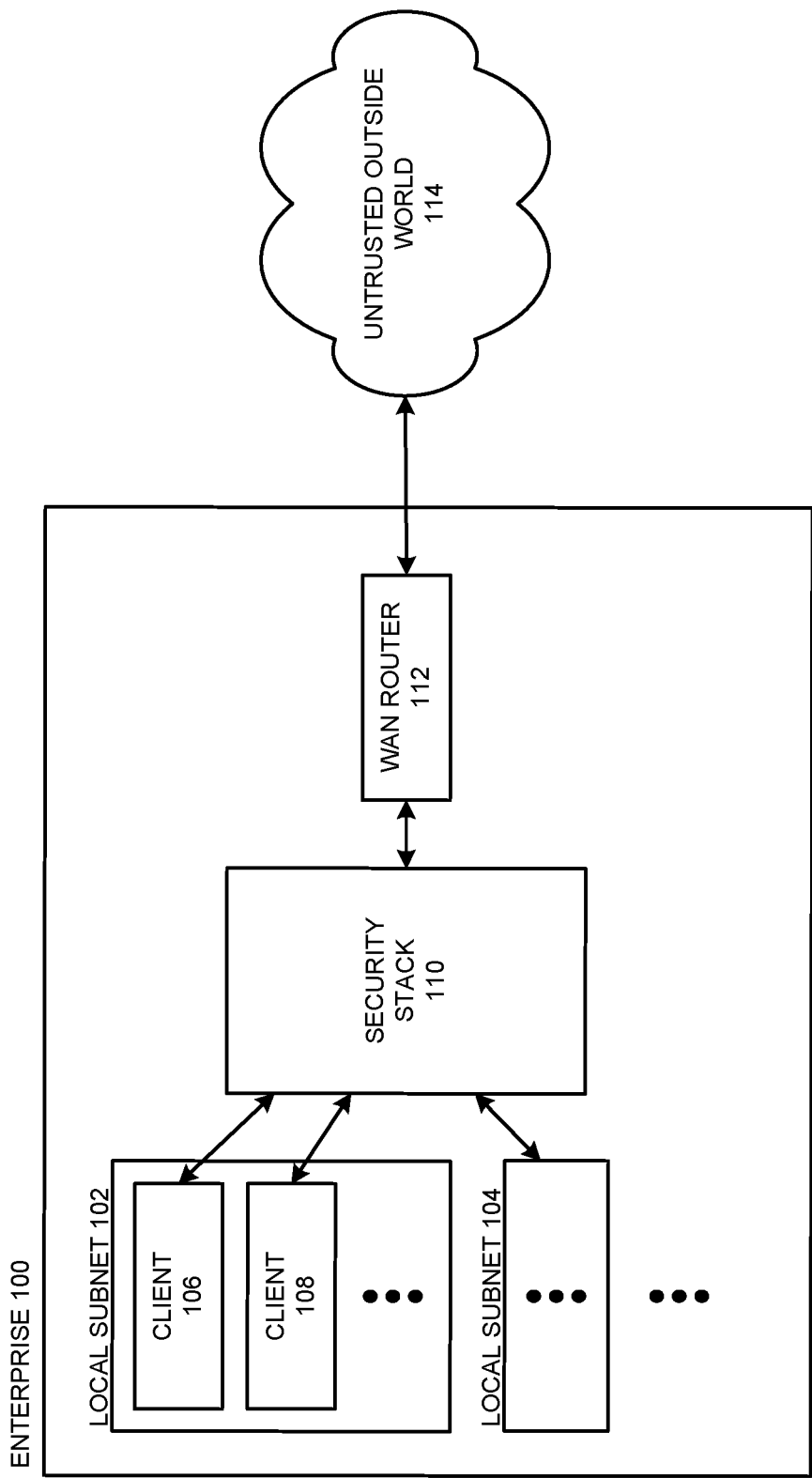
FIG. 1 illustrates a security configuration for a headquarters-based enterprise.

In traditional headquarters-based enterprises, a chief information officer (CIO) could design, evaluate, and implement a desired security stack (e.g., a set of security products and/or services) that would protect the enterprise data center and/or main office. A small set of remote employees would use VPN (virtual private network) connections to access the enterprise network. FIG. 1 illustrates such an environment, where an enterprise 100 includes a number of clients 106-108 that may be distributed across one or more local subnets 102-104. Client requests to access the wider Internet (e.g., untrusted outside world 114) all are routed through the enterprise security stack 110 before passing through wan router 112 to the outside world. Note that security stack 110 may comprise multiple products and/or services that execute in dedicated hardware or virtual machines. Such products may be ordered to ensure that traffic is analyzed in a specified order to monitor, secure, and test both outgoing and incoming traffic. For example, security stack 110 may be configured to perform URL filtering for outgoing web requests (e.g., to ensure that clients are not accessing inappropriate web sites) and perform anti-virus checks on files that are being downloaded from the untrusted outside world 114.

Unfortunately, traditional security practices that focus security resources primarily on securing a company headquarters are inadequate in a distributed environment. Mobile devices, high-speed networks and cloud computing have led to distributed enterprise environments in which a majority of users work remotely and access cloud-based applications. Providing distributed security services to an increasing number of distributed sites and individual mobile users involves significant challenges. For instance, some individual sites may not justify the expense of the desired security infrastructure. Furthermore, the set of security products and/or services that are installed at larger enterprise sites typically need to be updated frequently to counter constantly-evolving threats. However, as the number of sites and services grow, this update process is more likely to result in errors that can leave the enterprise vulnerable. Hence, while a CIO may still attempt to leverage an enterprise security stack, in reality this security stack may not be able to be up-to-date and/or applied enterprise-wide, and thus might not be able to scan all or even a majority of enterprise network traffic, leaving enterprises are more vulnerable to security threats.

Some security vendors have attempted to simplify such enterprise issues by providing data analysis services that allow enterprises to offload the purchase and management of security services. Instead, the security vendors create a solution, and a client enterprise then paths all of their traffic through the security vendor (e.g., via a proxy configuration). This approach can substantially increase the percentage (and hence security) of enterprise traffic, but can suffer from scalability issues and lack of customizability; enterprises are limited to the set of products and capabilities of each given security vendor, and dependent on a single point of failure.

In some embodiments, the disclosed techniques enable enterprises to configure and run a desired security stack using a cloud-based security delivery platform. One or more cloud compute services can be leveraged to provide a customized, redundant security analysis flow that chains together a desired set of best-of-breed security solutions. For instance, cloud compute services may provide services that include, but are not limited to, one or multiple of the following capabilities:
- Firewall;
- Anti-virus;
- Anti-malware;
- IPF (internet protocol filtering);
- IDS (intrusion detection system);
- UTM (unified threat management);
- spam detection;
- packet filtering;
- VPN (virtual private network) or other application-specific capabilities;
- DLP (data loss prevention, e.g., analyzing network traffic to detect sensitive data that is being sent in violation of information security policies); and
- any other type of desired traffic flow analysis.

Such services can be chained in any desired order across a range of cloud providers. For instance, depending on the geographic location of an enterprise (or the location of a given branch of an enterprise), such services may be instantiated on a nearby cloud provider that provides the desired capacity, reliability, and cost structures (E.g., AWS, Azure, Google cloud services, Alibaba cloud services, etc.) Multiple instances can be leveraged to provide comparable security for a worldwide enterprise, thereby ensuring that all of the enterprise data that is sent from end-user devices to the Internet is protected by the specified security stack.

The following sections disclose: (1) a docker-based architecture for providing scalable cloud-based security services; (2) ensuring that seamless service updates can be achieved for cloud-based security services; and (3) optimizing data transfer costs for cloud-based security services.

Providing Scalable Cloud-Based Security Services

In some embodiments, security services are instantiated as cloud compute services in conjunction with a flexible, efficient docker-based dispatcher architecture. More specifically, in traditional cloud-computing architectures every distinct piece of functionality would need to be instantiated in a separate virtual machine (VM), which, depending on the complexity of the desired traffic processing architecture, can substantially increase the overall system cost. In contrast, docker containers (or "dockers") provide a lighter-weight solution that facilitates automating the deployment of multiple applications (sometimes referred to as "microservices") inside distinct software containers that all operate within a single virtual machine and can communicate with each other using standard networking protocols (e.g., via Linux namespaces and IP-layer network protocols). Allowing independent containers to run within a single virtual machine avoids the cost and overhead of starting and maintaining multiple virtual machines. Note that such docker containers run in isolation and leverage operating system kernel resources to communicate; containers can be provisioned and provided with an abstraction of their own process space and interfaces, and can be constrained to use a specific defined amount of resources (e.g., CPU, memory, and network or other I/O bandwidth).

Figure 2A:
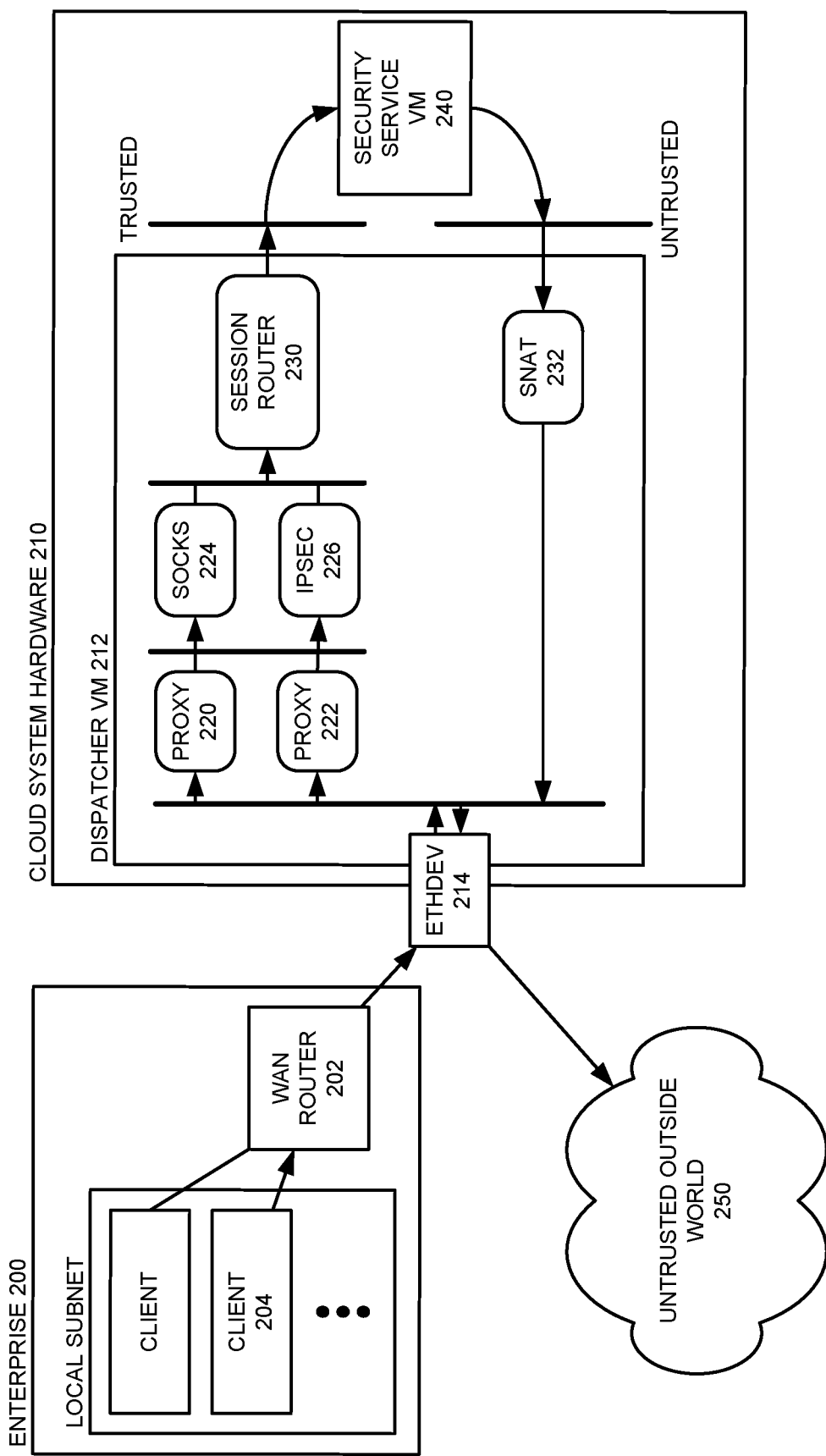
FIG. 2A illustrates an outgoing flow of traffic through an exemplary docker-based dispatcher architecture in accordance with an embodiment.
Figure 2B:
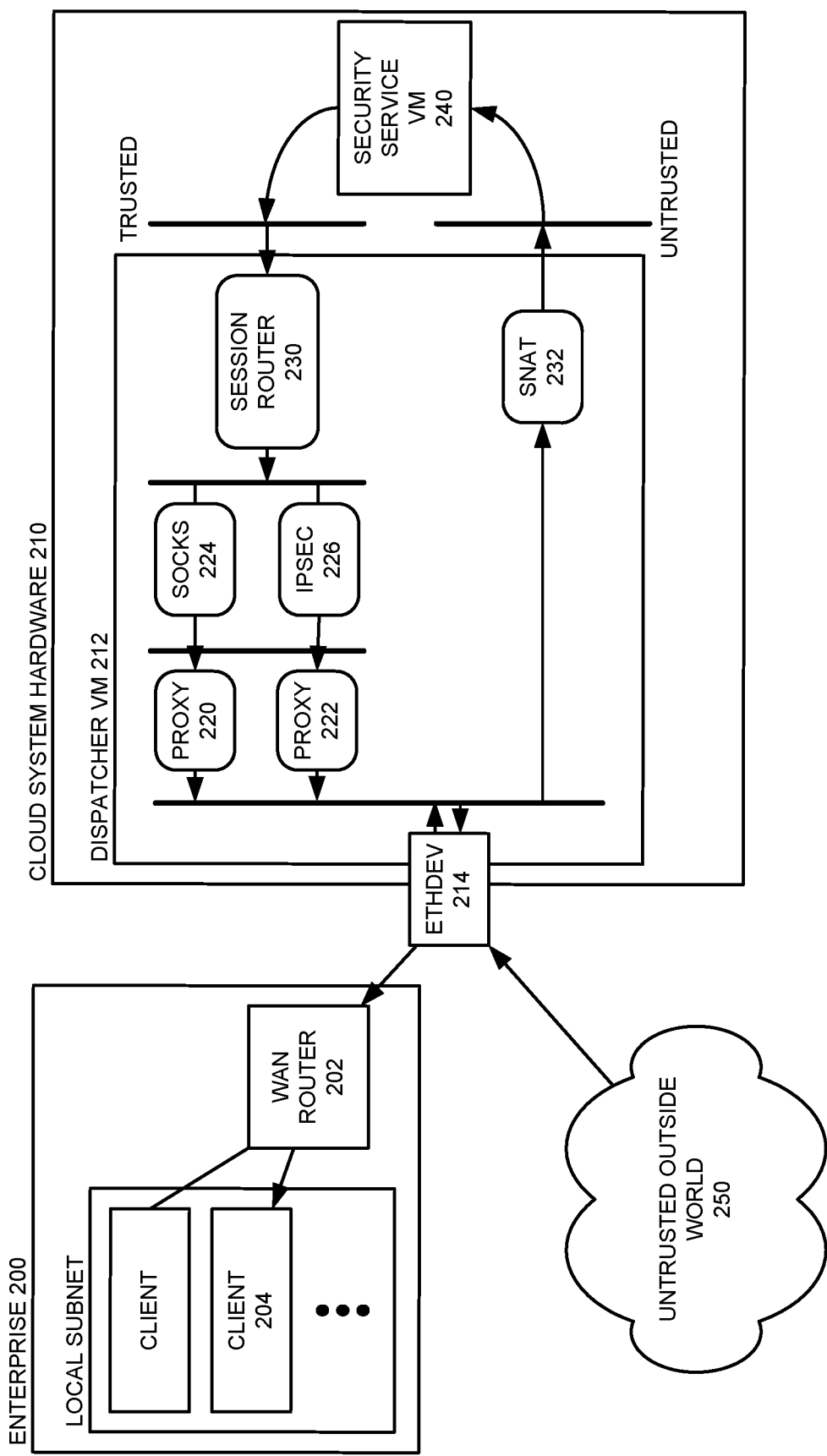
FIG. 2B illustrates a returning flow of traffic through an exemplary docker-based dispatcher architecture in accordance with an embodiment.

FIGS. 2A-2B illustrate traffic flows through an exemplary docker-based dispatcher architecture that encapsulates access to a security service. Note that while no local security stack is illustrated in enterprise 200 in FIG. 2A, the disclosed techniques could also operate either without or in conjunction with a security stack that is implemented in enterprise 200. Wan router 202 is configured to route traffic to an Ethernet interface ethdev 214 of cloud system hardware 210, which is physically located in the data center of a cloud computing provider. Thus, a network request that is initiated by client 204 is routed by wan router 202 and ethdev 214 to a dispatcher VM 212 that executes in cloud system hardware 210.

Dispatcher VM 212 comprises a set of docker containers (220-232) that route and manage traffic flows through a security service VM 240. More specifically, proxy 220 and proxy 222 (e.g., NGINX proxies) provide common front ends that receive traffic and further forward incoming traffic to traffic-ingesting docker processes, such as SOCKS docker 224 or IPSEC docker 226, which handle packets that use the SOCKS or IPSec security protocols, respectively; note that the disclosed techniques can incorporate a range of security protocols, and that additional dockers can be instantiated to handle any desired packet security protocol. These traffic-ingesting docker process (e.g., decrypt and/or otherwise unpack) the incoming packets and forward them to session router 230, which routes the traffic to a security service VM 240 that then performs the desired analysis upon the packets. From the context of security service VM 240, this request traffic is coming from the trusted (enterprise) network, and if the analysis is favorable, the request is forwarded on to the untrusted outside world 250. More specifically, if the outgoing traffic is not denied exit (by security service VM 240), the now-analyzed traffic is forwarded on to SNAT 232 (source network address translation), which (1) alters the return mapping for traffic (e.g., performs source network address translation) to ensure that any replies will be routed back to cloud system hardware 210 and then (2) forwards the traffic to the untrusted outside world 250 via ethdev 214.

Consider a scenario in which client 204 is attempting to access an external (to the enterprise) web page, and the security service is a stateful inspection firewall and anti-virus service that inspects outgoing and incoming enterprise traffic. In this context, the URL request is forwarded by wan router 202 through dispatcher VM 212, where the request is routed to the traffic-ingesting dock processes, decrypted, routed by session router 230 to security service VM 240, adjusted by SNAT 232 so that reply traffic returns to SNAT 232, and then sent on to the outside world 250 (specifically, to the website associated with the URL request). This website then sends the content associated with the URL back to the adjusted return address (SNAT 232), and this content is then checked via the reverse path through the system, as illustrated in FIG. 2B.

In FIG. 2B, the outside site (in untrusted outside world 250) that was accessed by the initial request returns the requested content to ethdev 214, where it is routed back to SNAT 232 (as specified in the adjusted outgoing request). SNAT 232 routes the return traffic to security service VM 240, which detects that this is return traffic coming from the untrusted outside world 250, and proceeds to analyze the return traffic. Security service VM 240 forwards return traffic that is deemed to be safe/valid/appropriate on to session router 230, which ensures that it that the return traffic is routed through the proper packet security protocol. The return traffic then passes back through ethdev 214 to wan router 202, which then routes the results to the initial requester, client 204. Note that wan router 202 may be configured to only accept traffic from specific trusted sources such as cloud system hardware 210 and/or only accept traffic that has been secured using credentials and/or protocols that are associated with remote sites that are known to implement the desired security stack. Note also that the source IP address, the destination IP address, and other identifying information that are associated with the network request may be retained throughout the flow of traffic through the dispatcher and security service(s), to ensure that the system can identify and properly route both incoming and outgoing traffic correctly.

While FIGS. 2A-2B illustrate a scenario in which set of traffic flows are initiated from inside enterprise 200 (e.g., by client 204), in other scenarios the opposite may be true. For instance, in another scenario a user outside of enterprise 200 may initiate a connection to enterprise 200, and all of the traffic that is sent to enterprise 200 (and return traffic that is sent back to the user) would also be processed through the cloud-based security service (also referred to as the cloud-based security stack).

In some embodiments, individual devices (not shown) outside of enterprise 200 can also be configured to test and/or access the described encapsulated security services. For instance, once dispatcher VM 212 and security service VM 240 have been instantiated, such devices can be configured with proxy settings that route traffic through the desired security stack executing in cloud system hardware 210. Such configurations can also be used to demonstrate the operation of the cloud-based security stack on a per-device basis.

Note that the dispatcher architecture illustrated in FIG. 2A allows many processes that would otherwise need VMs to instead execute in docker containers, thereby reducing the number of virtual machines that are needed from eight to two and potentially reducing VM costs to a quarter or less of the amount that would otherwise be required (e.g., if each illustrated docker in FIG. 2A was instead implemented as a separate VM). An architecture that leverages docker containers can also overcome some of the challenges associated with operating in a cloud computing environment. For instance, chaining operations across multiple VMs in a data center can sometimes be challenging; cloud computing providers often limit the ability to route or change traffic destinations and processing due to fear that such capabilities might enable attacks on other cloud users and/or the "hyper-cloud" (overall cloud infrastructure). While this may result in some aspects of VM functionality being limited from the networking standpoint in a cloud environment, docking containers that all interact within the same virtual machine do not have the same limitations, and thus can be used to manage and route network traffic through chains of security services (as described below).

Figure 2C:
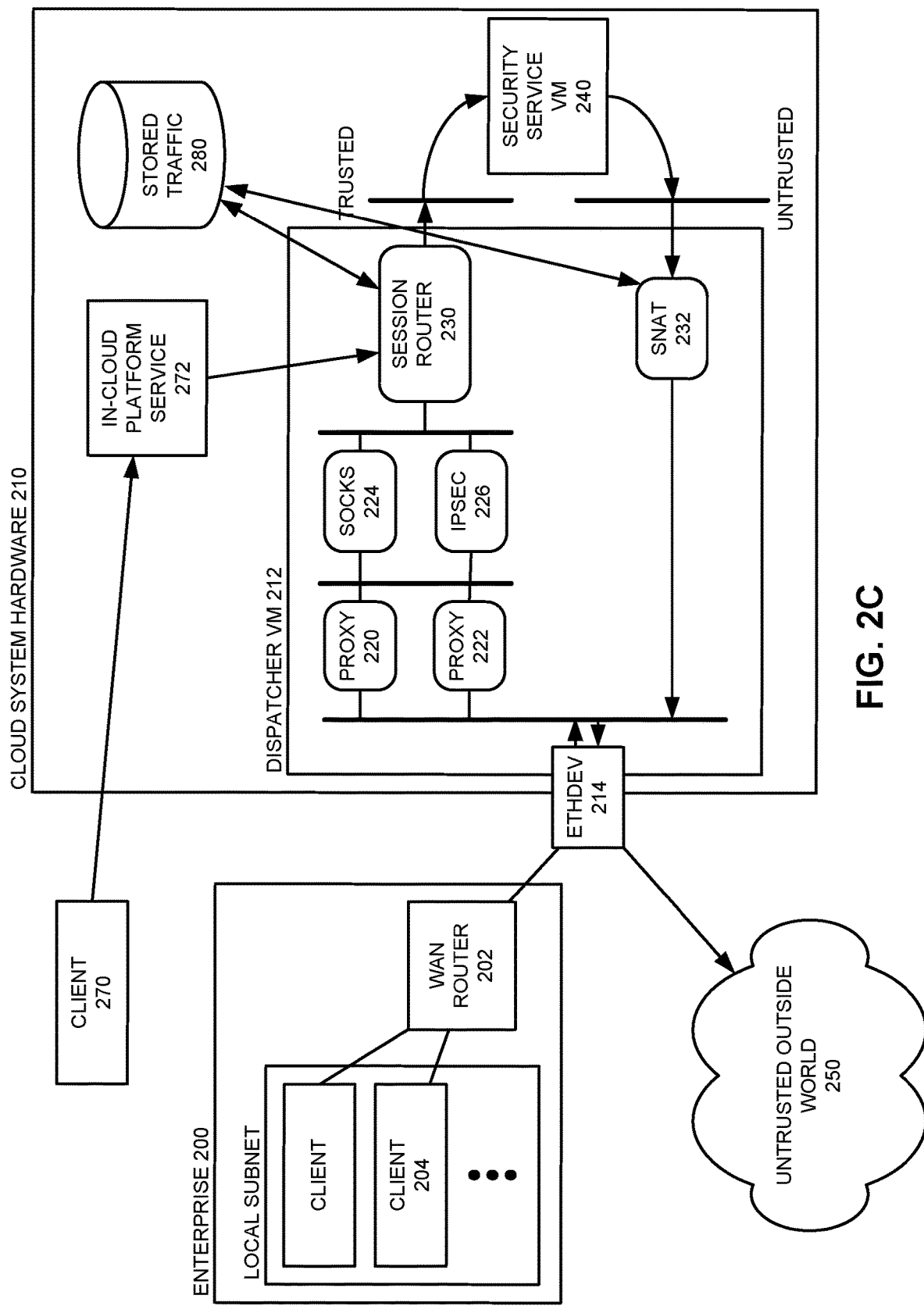
FIG. 2C illustrates a flow of traffic from an in-cloud platform service passing through an exemplary docker-based dispatcher architecture in accordance with an embodiment.

FIGS. 2A-2B illustrate a scenario in which traffic originates in enterprise 200, which could range in size from a major enterprise site with many users (and additional security infrastructure, as described above) to a small remote office with minimal security infrastructure (e.g., only a wan router 202 that ensures security for the site by routing traffic through the cloud-based security stack). In some scenarios, however, traffic for the cloud-based security stack may also (or alternatively) originate from the cloud environment. FIG. 2C illustrates another scenario in which a remote client 270 (which may be external to enterprise 200, as illustrated, or might also be located within enterprise site 200) generates outgoing network traffic via an in-cloud platform service 272. For instance, in-cloud platform service 272 may be an application executing directly within a VM in the cloud system hardware 210 already instead of at enterprise site 200.

In-cloud platform services simplify some aspects of executing applications remotely; instantiating and configuring cloud services can be complex, and hence to encourage cloud use cloud service providers may provide an environment that already provides and pre-configures operating system infrastructure and runtime environments to allow users to easily upload an application (or potentially even just specify an application that is already available/provided as a supported application by the cloud storage provider) and application data, and then have the application execute upon the data as desired with minimal additional configuration and overhead. The cloud service provider automatically keeps this provided infrastructure up-to-date (e.g., applying infrastructure application updates as they become available), thereby reducing some of the maintenance overhead for the client/site using the service. In-cloud platform services can also allow for more efficient collaboration across multiple sites (e.g., serving as a central point of collaboration for multiple distributed sites). However, ceding configurability and control of the operating system and execution environment to the cloud service provider can also be a limitation from the security perspective, making it more difficult to customize security and other configuration aspects.

In some embodiments, the inputs and outputs of an in-cloud platform service are routed from and to (respectively) a cloud-based security stack. For instance, as illustrated in FIG. 2C, in-cloud platform service 272 may be configured to send any outgoing network traffic initiated by client 270 directly to session router 230. Note that because in-cloud platform service 272 is already executing in cloud system hardware 210 (e.g., either in the same actual server hardware or in the same trusted data center environment), it can bypass low-level packet-based security mechanisms (socks 224/ipsec 226) and connect directly to session router 230. Alternatively, other ingress/egress points may also be configured depending on the security of the cloud environment. FIG. 2C illustrates outgoing traffic from in-cloud platform service 272; return traffic would return to session router 230 (e.g., as illustrated in FIG. 2B) and then be forwarded back to in-cloud platform service 272 by session router 230. Similarly, in-cloud platform service 272 could be registered with session router 230 to accept incoming flows initiated from the outside world 250 via the cloud-based security stack.

In some embodiments, the routing between cloud-based security services is configured and protected using block chain routing. In a private data center security services (e.g., a Palo Alto Networks security service or a Cisco Sourcefire security service) that are chained together to scan traffic may be linked together using network layer two impersonation techniques. For instance, a stand-alone device providing such a service might impersonate another device on the internal network to intercept and scan traffic at the network MAC layer. However, this level of impersonation is typically not available or disabled in cloud data centers. Instead, some embodiments modify the routing for every service, device, and or entity in a cloud-based environment to ensure the desired flow of traffic. For instance, in the Azure cloud environment a security administrator might modify user-defined routing parameters to send the output traffic of a security service to the next service in the chain. Note that these settings are typically distinct from host routing—the service itself may think it is configured to route traffic in its normal way, but the underlying cloud and/or dispatcher VM configuration ensures that the outputs are routed as needed to support the correct flow of the cloud-based security stack. In other cloud environments (e.g., in AWS) such routing can be configured by modifying BGP routes; route announcements in BGP are made via a broadcast system.

Such techniques ensure that routes are propagated and resolved quickly, allowing security solutions to be rapidly reconfigured as needed to resolve evolving threats. This is a significant advantage in comparison to systems where updates take a long time to distribute and announce—however, such capabilities also provide a potential vulnerability in that a malicious party that is able to adversely configure the routing between a chain of security services may be able to bypass such security services completely and create vulnerabilities that can then be exploited. More specifically, the route entries inside the cloud are essentially the public ledgers inside a blockchain implementation; the route entries are distributed in nature, but need to be protected and confirmed as containing valid data to ensure that application or VM traffic cannot be routed to rogue entities.

In some embodiments, block chain routing detects and prevents route hijacks by including signed identification information in route information. For instance, a route announcement may be required to be signed in a manner (e.g., a code signed using a HMACSHA256 hash and public/private key pair) that can be confirmed by a separate auditing service that continuously verifies that only valid routes are being configured for the system. This auditing service uses the private key portion of the key pair to confirm that only validly-signed routes are applied, and flag and/or halt any attempts to configure invalid routes in the cloud-based security stack. Such techniques enable customers of the cloud-based security stack to confirm and track/audit that their traffic flows are being directed as planned. Note that such certificate authentication can leverage elliptic curve cryptography to ensure strong and fast asymmetric authentication.

In some embodiments, a cloud-based security stack can also be configured to perform "tapping" (or "mirroring") by storing in the cloud some or all of the incoming and outgoing traffic that is processed by the cloud-based security stack for future analysis. For example, as illustrated in FIG. 2C, all outgoing traffic received by session router 230 and incoming traffic received by SNAT 232 may also be stored 280 in the cloud, where ample data storage capacity is cheaply available. Stored traffic 280 can then be re-analyzed at subsequent times, for instance when new or updated versions of security services become available, to determine if there were any previous intrusions or attacks that were not detected at the time they were originally sent. While such capabilities do not undo the effects of previous attacks, the knowledge that such attacks did happen, knowledge of what (if anything) was compromised, and any preserved information (e.g., source of the traffic, and the specific type of attack, etc.) may still be beneficial in determining a subsequent course of action.

Figure 9:
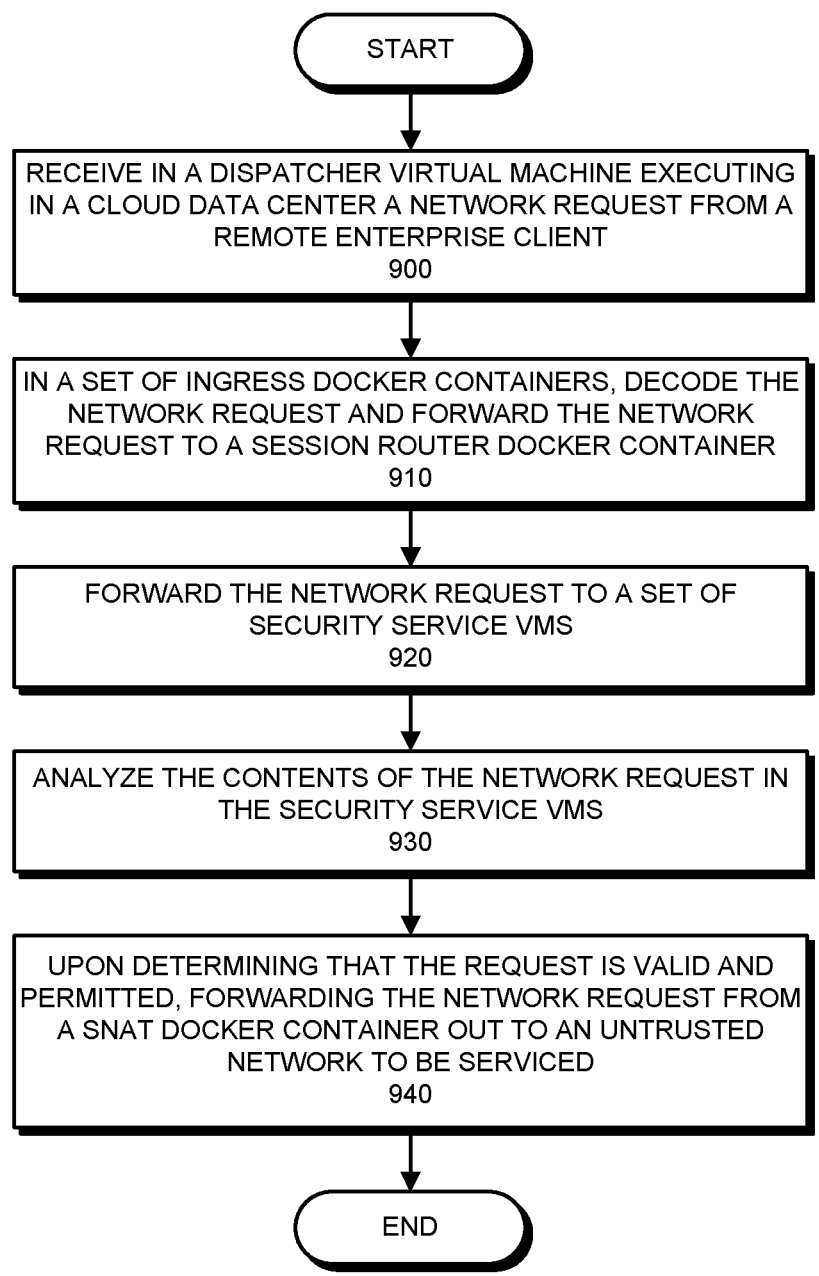
FIG. 9 presents a flow chart that illustrates the process of providing scalable cloud-based security services in accordance with an embodiment.

FIG. 9 presents a flow chart that illustrates the process of providing a cloud-based security service. During operation, a dispatcher virtual machine (VM) executing in a cloud data center receives a network request from a remote enterprise client (operation 900). The dispatcher VM executes multiple docker containers, including a set of ingress docker containers that decode the request and then forward it to a session router docker container (operation 910) that in turn forwards the request to a set of security service VMs (operation 920). After these security service VMs have analyzed the contents of the request (operation 930) and determined that the request is valid and permitted, a SNAT docker container then sends the request out to an untrusted network to be serviced (operation 940).

Cloud-Based Service Chaining

Figure 3A:
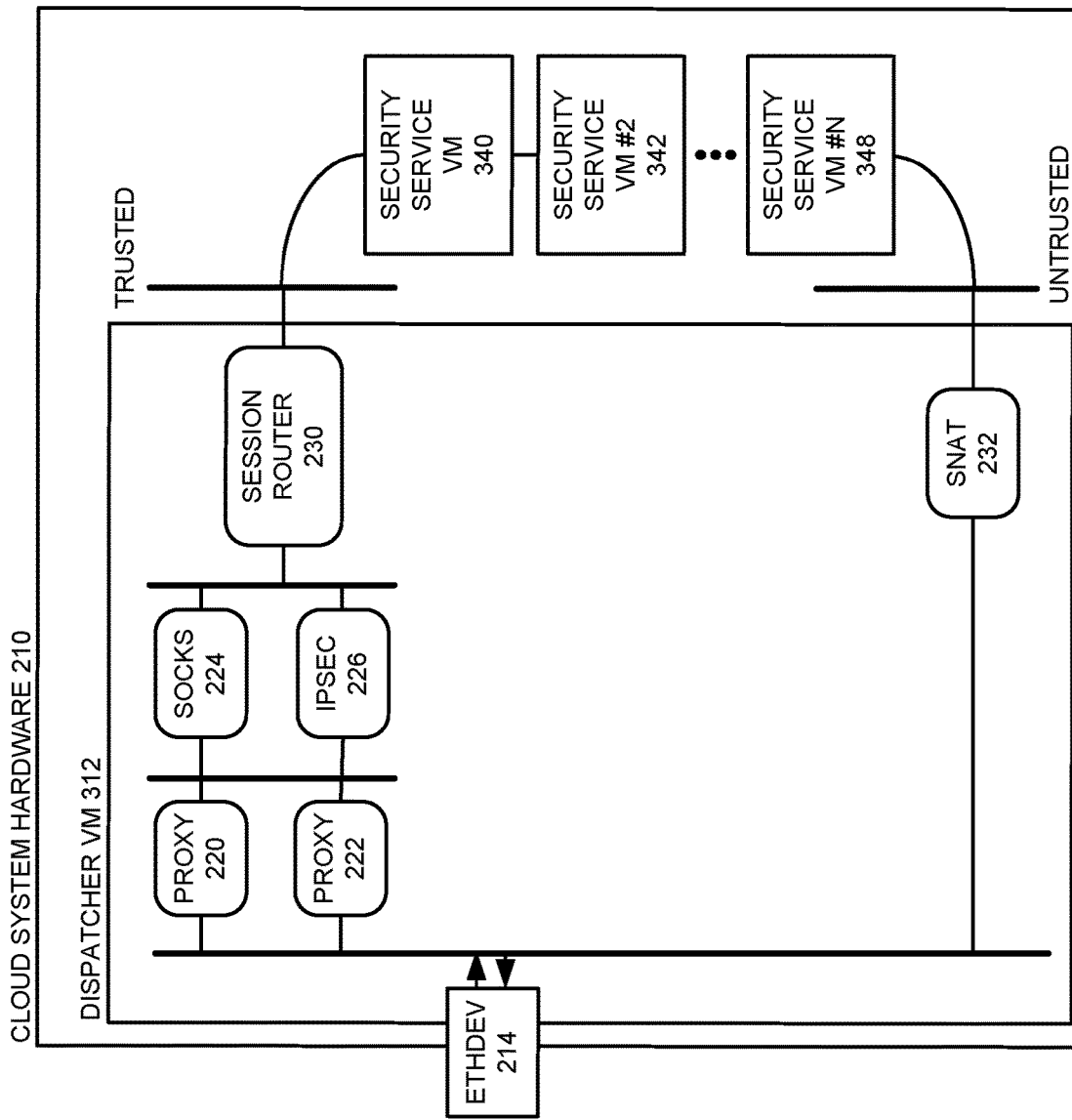
FIG. 3A illustrates an architecture in which a dispatcher routes traffic thought multiple security services that are directly chained together in accordance with an embodiment.
Figure 3B:
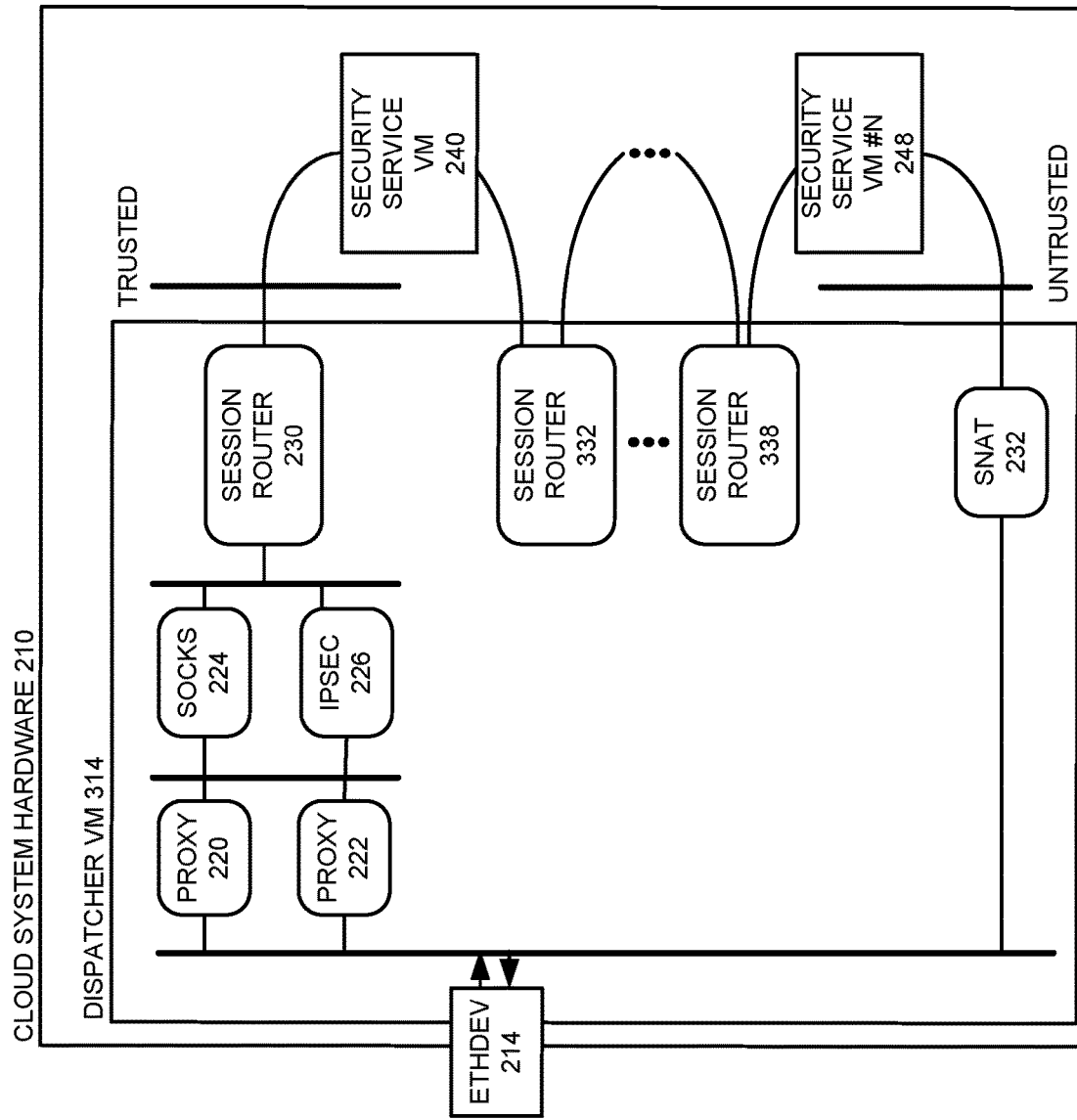
FIG. 3B illustrates an architecture in which a dispatcher in which multiple security service virtual machines (VMs) are chained together using intermediate session routers in accordance with an embodiment.

While FIGS. 2A-2C illustrate a cloud-based security stack with a single security service executing in a VM, many enterprises may leverage multiple different services that analyze different aspects of traffic flows and/or protect from different types of threats. In some embodiments, a docker-based architecture is used to route traffic flows through a chain of best-of-breed security services that execute in VMs. More specifically, the dispatcher automates the instantiation, operation, and maintenance of multiple security services in a cloud computing environment. FIGS. 3A-3B illustrate two exemplary techniques for chaining together multiple security services. The choice of chaining technique may have different impacts on how security services are updated and replicated.

FIG. 3A illustrates an architecture in which the dispatcher VM 312 routes traffic through multiple security services 340-348 that are directly chained together; when instantiating security services 340-348, session router 230 and/or other processes executing in dispatcher VM 312 configure the routes in each security service VM so that they send traffic that they have processed on to the next VM in the chain (for the direction that the traffic is traveling) and then on to session router 230 or SNAT 232 (based on the direction that the traffic is traveling). Routing traffic directly between VMs is more efficient, but also means that the entire chain has to be serviced (and/or restarted/reconfigured) as a single unit if any of the individual security services need to be upgraded, which may involve higher overhead.

FIG. 3B illustrates an architecture in which the dispatcher VM 314 configures each security service VM (340-348) in the chain to output traffic flows to an intermediate session router (e.g., session routers 332-338). In contrast with the example of FIG. 3A, this organization allows individual security service VMs to be upgraded and/or otherwise changed without needing to halt all of the VMs in the chain. However, this architecture also requires additional session router dockers, which may consume more resources in the dispatcher VM 312 and thus may reduce the scalability and/or performance of the dispatcher VM 312. In some embodiments, a dispatcher may choose between these two (or other) architectures based on factors such as the characteristics (and number) of the security services, expected traffic, etc.

Note that the order in which security services are chained may sometimes be important. For instance, a service that decrypts traffic should generally be performed before any services that need to operate upon unencrypted data. In another example, it may be beneficial to perform operations that are more likely to fail (e.g., security services that have been determined to be more likely to reject and halt a request) first, thereby reducing unnecessary computation in other security services that are later in the chain. In general, every CIO may have a different opinion of which security services are best and how they should be ordered; the ability to instantiate a cloud-based dispatcher that in turn instantiates and manages a set of desired security services facilitates easily testing out different security services and orders to find a beneficial combination. Note that this is distinct from service providers that only provide a set of their own services in a specified defined order.

In some embodiments, the architecture described above is cloud-provider agnostic, and can execute in any cloud provider environment that: (1) provides virtual machines that can execute a chain of desired security services; and (2) provides a base set of dockers that support the needed set of virtual private container and independent networking capabilities. Note that multiple instances of dispatchers and service chains may simultaneously execute in multiple different cloud computing providers and in different geographic locations, for instance to ensure that every major enterprise site is located in close network proximity to a security stack (thereby reducing network latency for traffic flows). Aspects of redundancy and service updates are described in more detail in the following section.

Seamless Service Updates for Cloud-Based Security Services

Ensuring that security services are updated in a secure, efficient, and timely manner can be quite challenging as the number of enterprise sites scales. For instance, consider from the enterprise viewpoint a security service (e.g., a stateful inspection firewall) that receives five critical updates a month. For a company with a single (headquarters) location, this may not seem like a significant issue. For instance, if the security service executes on a dedicated hardware appliance in the data center or as a virtual machine, a typical procedure might be to load the updated software to the host device and then, at some low-traffic time of day (e.g., midnight), reboot into the new version. However, such operations interrupt service, which can be an issue for a global enterprise that is expected to have resources available and operating at all times of the day.

In addition to service interruptions, other issues can also come up during upgrades. Consider, for instance, that for a large enterprise with 150 sites that each have active instances of the security service, five critical updates per month becomes on average 750 upgrades per month for just the one security service. Increasing the number of sites and the number of security products being upgraded substantially increases the likelihood that some aspect of one or more upgrades will fail, no matter how carefully upgrades are managed. This can become a major issue both in terms of downtime because Internet access is increasingly enterprise-critical (e.g., if enterprise users cannot perform billing, ordering, or other information accesses due to the security stack being down) as well as in terms of risk of infection if an update that was not successfully completed leads to an exploitable vulnerability.

In some embodiments, a cloud-based security stack offers substantial advantages in: (1) allowing the throughput of the security stack to be scaled up flexibly; (2) allowing service upgrades to be performed in-place with no downtime; and (3) providing redundancy for the security stack in case of failure of any specific hardware device or any one cloud storage provider. Security stack scalability is achieved by instantiating multiple copies of security services and/or dispatcher dockers as needed, depending on where in the security stack performance has become constrained. As mentioned above, dockers can be provisioned with a subset of VM resources. Traffic flows through all of the dockers fairly evenly, so unless some processes require more computation than others (e.g., decryption or encryption may involve heavier computation), the resources of a dispatcher VM may be allocated evenly between the dispatcher dockers. If the amount of traffic being received by a dispatcher approaches the compute capabilities of the hardware hosting the dispatcher VM, one or more additional dispatcher VMs and security service chains can be instantiated on an as-needed basis to ensure that the entire enterprise traffic flow can be handled in the cloud. Note that the usage and overall capacity of both the instantiated dispatcher and security service VMs can be tracked over time, so that additional unneeded VMs can also be stopped and deallocated when no longer needed to reduce costs.

Figure 4A:
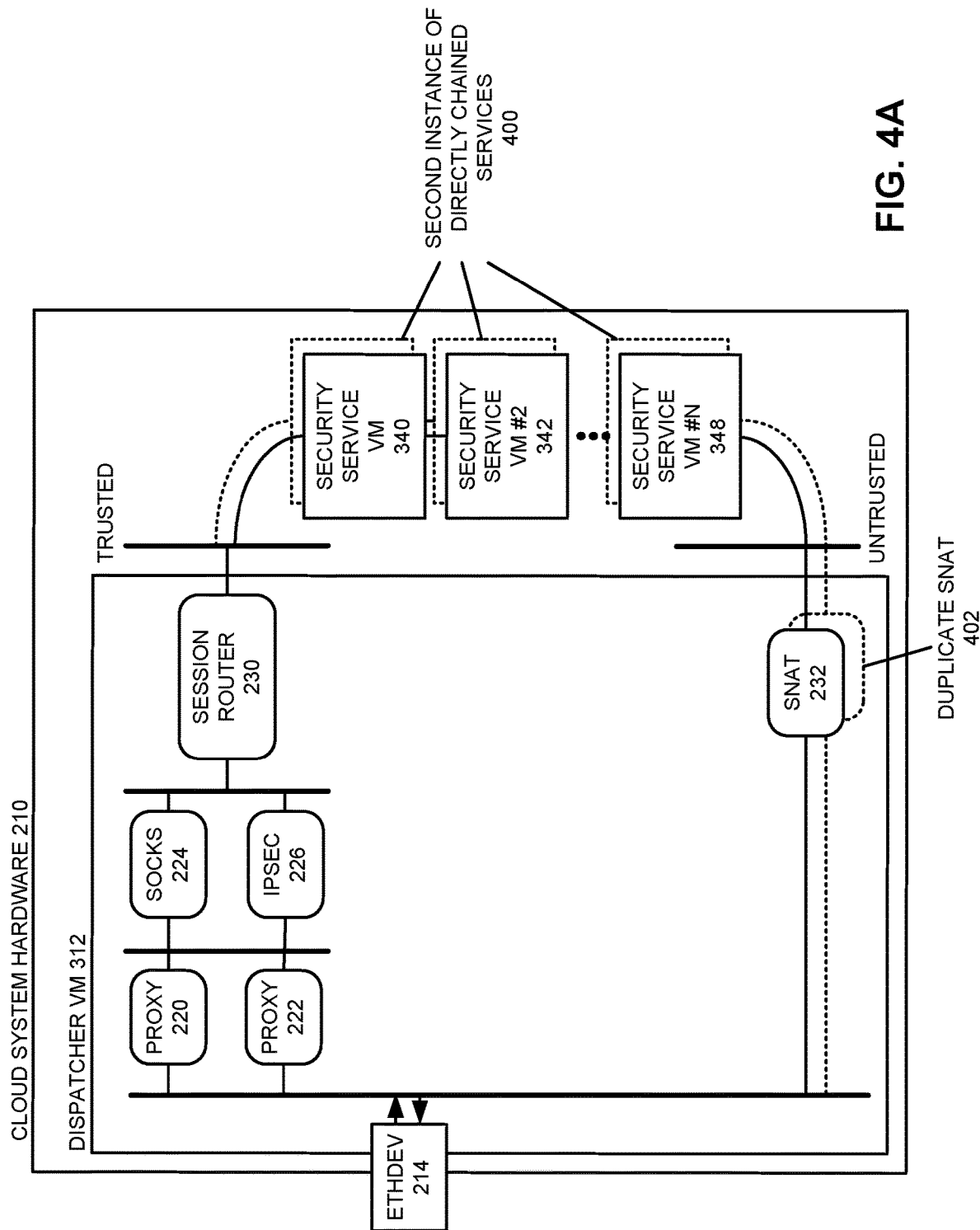
FIG. 4A illustrates a scenario in which two instances of chained security services have been instantiated in the context of FIG. 3A in accordance with an embodiment.
Figure 4B:
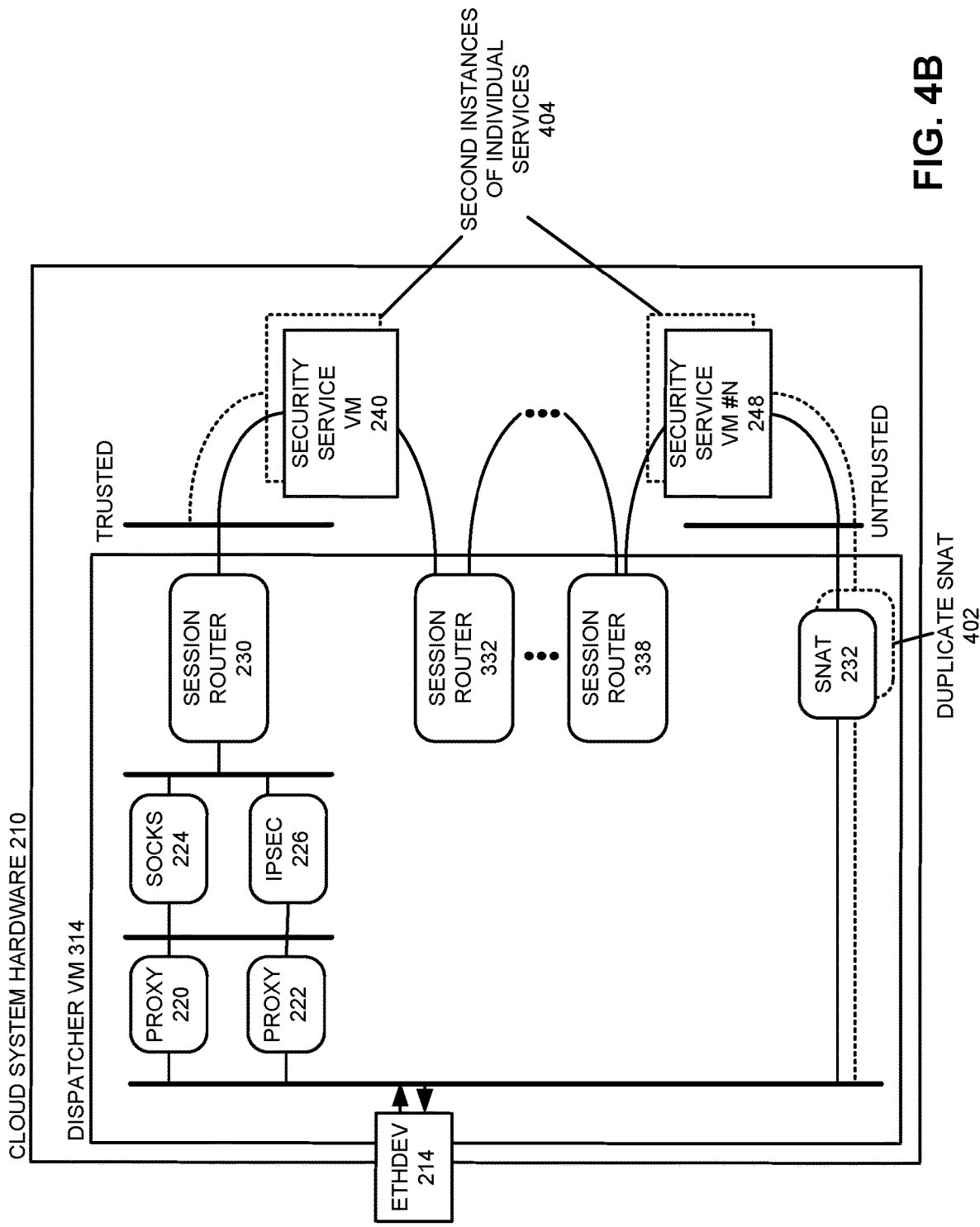
FIG. 4B illustrates a scenario in which two instances of individual security services have been instantiated in the context of FIG. 3B in accordance with an embodiment.

FIGS. 4A-4B illustrate second instances of chained services that have been instantiated in the contexts of FIGS. 3A-3B, respectively. In FIG. 4A, a second instance of the directly chained services 400 have been instantiated in a second set of VMs. This second instance 400 may have been instantiated to increase the traffic flow capacity for the enterprise, or to upgrade one or more of the chained security services. For capacity scaling, having the second instances 400 of the security stack enables the session router 230 to perform load balancing by selectively routing traffic to either the first or the second chain. Note that SNAT 232 has also been duplicated by a second duplicate SNAT docker container 402. This is necessary to separate return traffic properly between the two chains; security services may store state for an outgoing request to be used when analyzing the return traffic for the request, and thus it is important to ensure that return traffic for a request goes through the same security chain that the original request went through. Hence, SNAT 232 and duplicate SNAT 402 adjust the source addressing for their respective outgoing traffic so that responses come back to the respective sender and can be routed back through the desired chain of security service VMs.

Figure 5A:
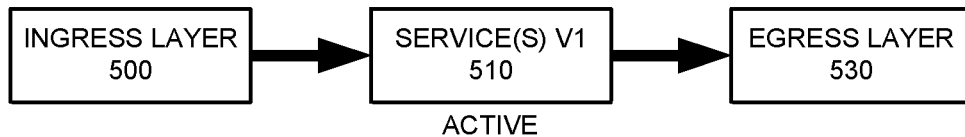
FIG. 5A illustrates traffic flowing through a first version of an instantiated security service in accordance with an embodiment.
Figure 5B:
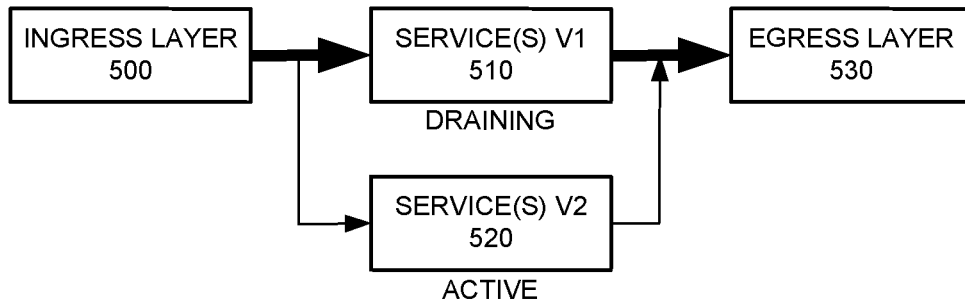
FIG. 5B illustrates traffic flowing through the first version of the instantiated security service while a second version of the security service has been instantiated but is still undergoing testing in accordance with an embodiment.
Figure 5C:
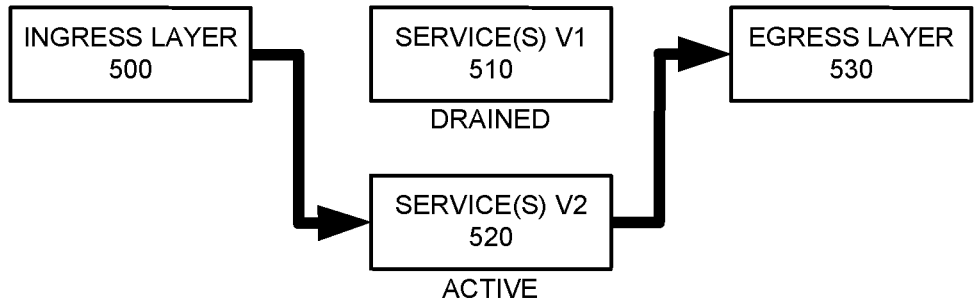
FIG. 5C illustrates traffic flowing through the second instantiated security service while the instantiated first version of the security service is still executing but has been drained of all traffic flows in accordance with an embodiment.
Figure 5D:
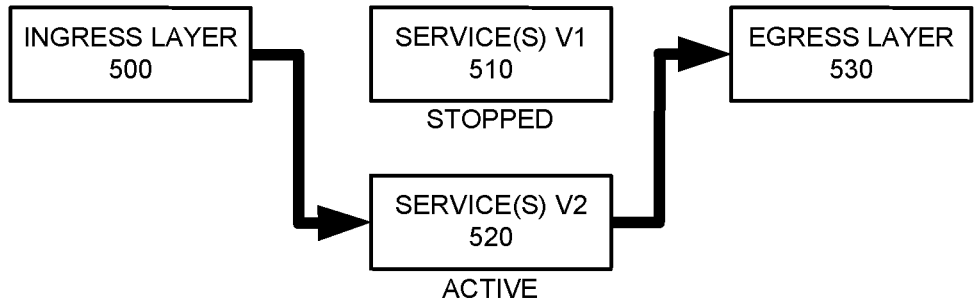
FIG. 5D illustrates all of the traffic flowing through the second instantiated security service after the instantiated first version of the security service has been stopped in accordance with an embodiment.

When upgrading the version of one (or more) of the security service(s) 340-348, the entire chain of services 340-348 needs to be replaced by a new chain that includes the new version of the target services. More specifically, when the security service VMs 340-348 are directly linked to each other, fitting in a new updated VM may not be possible, and thus the entire chain is replaced as a whole. However, this process can be managed in a manner than ensures that service interruptions are avoided, as illustrated in FIGS. 5A-5D. In FIG. 5A, traffic flows from an ingress layer 500 (e.g., the docker containers in the top half of dispatcher VM 312) into the version (V1) of the service(s) 510. Services 510 perform the desired analysis and, if deemed appropriate, forward output information out through the egress layer 530 (e.g., via SNAT 232). In FIG. 5B, a new version of the service, (V2), has been instantiated, but the majority of the traffic flow is still routed through the original instance of the service 510. For instance, session router 230 may send either some tests or a small set of initial traffic through the updated version 520 to ensure that the updated service version operates as expected. If the tests are successful and the updated version 520 seems to be working well, session router 230 stops sending new traffic through the original instance 510, and eventually sends all new traffic through the updated instance 520, thereby draining any existing traffic flows that were sent through original instance 510 (as illustrated in FIG. 5C). Note that this may take some time, since the original instance 510 may need to wait to ensure that pending return traffic that is associated with earlier requests is received, routed, and analyzed properly. For example, session router 230 may be configured to identify and track existing sessions (e.g., traffic flows), and after some reasonable time interval has passed, stop the original instance 510 (as illustrated in FIG. 5D). For instance, session router 232 might keep the original version of the service 510 around for a specified time hour (e.g., four hours) just to ensure that there is a fallback scenario if some issue is detected for the updated instance; if this were to happen, the session router 232 could direct traffic back to the original version 510. However, if everything works correctly post-switchover, the original service 510 can be completely stopped and removed from service (as illustrated in FIG. 5D).

In FIG. 4B, a second instance of one or more individual services 404 have been instantiated in a second set of VMs. Note that having session routers between each security service in a chain allows for individual services to be replicated or upgraded individually, unlike in FIG. 4A, where a new version of the entire chain has to be instantiated. This means that if one particular security service becomes a bottleneck, the system can allocate one or more additional VMs for just that bottleneck service, instead of instantiating a new instance of the entire chain of security services (as in FIG. 4A), thereby reducing the number of VMs that are used (and paid for). As described for session router 230 in FIG. 4A, the session routers 230/332/338 ensure that traffic flows are balanced between each specific set of replicated services in the chain of services, and ensure that return traffic is also routed to the same service that handled the corresponding initial traffic. Note that in this organization, traffic can be passed in and out of the dispatcher VM as often as needed. The upgrade of individual security service VMs is similar to that described for FIG. 4A above (e.g., the steps disclosed to describe FIGS. 5A-5D), with the difference that only a single VM is being replaced instead of a chain of multiple VMs.

Note that docker containers can also be replicated to increase traffic flow capacity, as well as for other reasons. For instance, an IPSec container 226 might also be duplicated to perform a service upgrade (e.g., a service upgrade that updates the encryption code being used for IPSec). Just as described for security service VMs above, a new container can be instantiated for the new version, and traffic flow sessions can then be smoothly balanced over to the new container.

In some embodiments, upgrading security services may involve some additional steps to accommodate licensing requirements. For example, an original version of a service that is being upgraded may be associated with a license. In this case, an upgraded version of the service may be instantiated in a second instance using a temporary license, for testing and upgrade purposes. After the upgraded version has been validated, traffic can be transferred to the upgraded version, the original version can be drained and stopped, and then a third instance can be instantiated using the initial (now available) license. Traffic flows can then be smoothly transferred over to this third instance in the same way.

Figure 10:
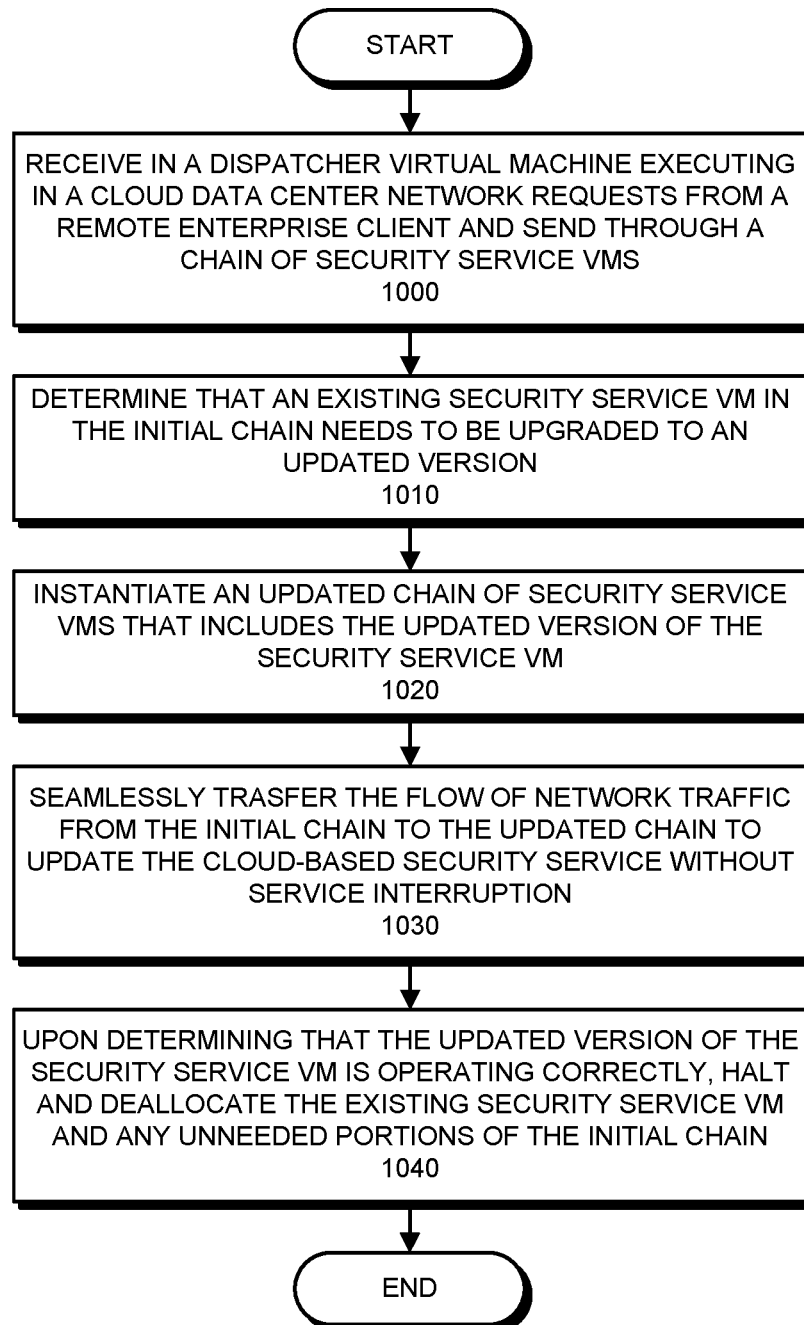
FIG. 10 presents a flow chart that illustrates the process of providing seamless service updates for cloud-based security services in accordance with an embodiment.

FIG. 10 presents a flow chart that illustrates the process of providing seamless service updates for cloud-based security services. A dispatcher virtual machine (VM) executing in a cloud data center receives network requests being sent from one or more clients located in a remote enterprise location to one or more untrusted remote sites that are external to the remote enterprise location and the cloud data center (operation 1000). This dispatcher VM manages the flow of network traffic through an initial chain of two or more security service VMs that execute in the cloud data center and analyze the contents of network traffic to and from the clients. During operation, the dispatcher VM determines that an existing security service VM in the initial chain needs to be upgraded to an updated version (operation 1010), and instantiates in the cloud data center an updated chain of security service VMs that includes the updated version of the security service VM (operation 1020). The dispatcher VM then seamlessly transfers the flow of network traffic from the initial chain to the updated chain to update the cloud-based security service without interrupting the operation of the cloud-based security service (operation 1030). Upon determining that the updated version of the security service VM is operating correctly, the dispatcher VM halts and deallocates the existing security service VM as well as any unneeded portions of the initial chain (operation 1040).

Optimizing Data Transfer Costs for Cloud-Based Security Services

In some cloud computing environments, the networking cost for data that is sent into a cloud computing service is very cheap (or even free), but the networking cost of data that is sent out of the cloud computing service is expensive. Such an arrangement can make processing all of an enterprise's traffic in a cloud-based security stack prohibitively expensive. In some embodiments, WAN optimization techniques are leveraged to reduce the networking costs for a cloud-based security stack. More specifically, the amount of data that is sent into the cloud-based security stack remains the same, but an intermediary computing device is used to substantially decrease the amount of data that needs to be transferred out of the cloud-based security stack. For example, the intermediary may: (1) receive and cache all of the data that is received from the untrusted outside world; (2) forward this data to the cloud-based security stack to be analyzed; and then (3), upon receiving a very short approval indication from the cloud-based security stack that the received data is approved, forward the cached data back to the requestor. In this scenario, the system leverages the inbound network link and the advantages of the computing capabilities of the cloud computing environment, but substantially decreases the amount of outgoing data that is sent from the cloud computing environment, thereby substantially reducing the network costs of executing the security stack in the cloud.

In some embodiments, the intermediary computing device is located in another intermediate data center that may not have the same level of reliability and flexible scalability of a cloud computing environment, but provides high-performance computing and networking capabilities. For instance, the intermediary computing device might be a leased or purchased hardware device that is physically hosted in and managed by the intermediate data center, with the intermediate data center providing high-speed network connectivity at a flat rate.

Figure 6:
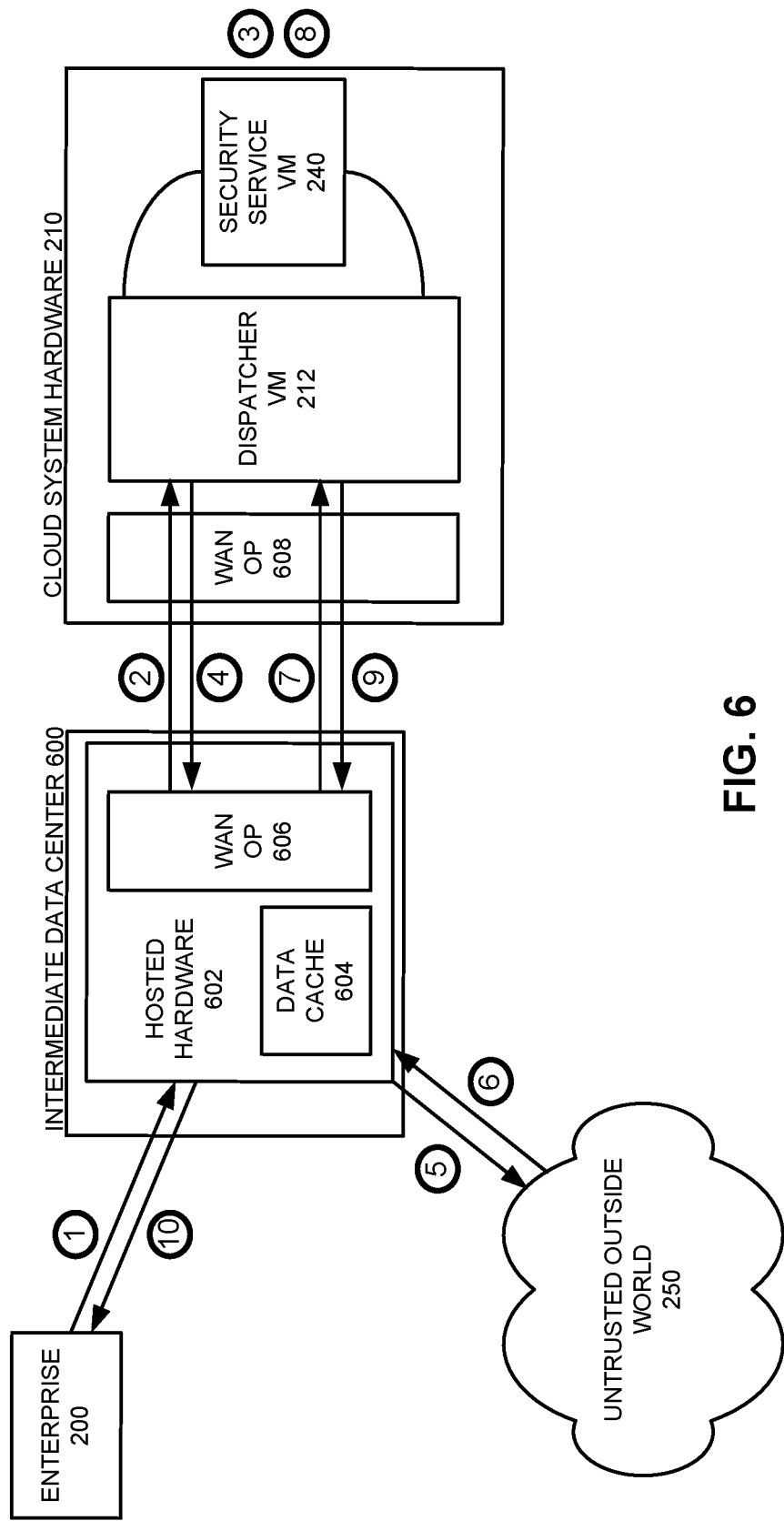
FIG. 6 illustrates an exemplary scenario in which traffic for an enterprise is routed through an intermediary en route to a cloud-based security stack in accordance with an embodiment.

FIG. 6 illustrates an exemplary scenario in which traffic to and from enterprise 200 is routed through hosted hardware 602 that is located in an intermediate data center 600, while the dispatcher VM 212 and security service VM 240 execute in the cloud computing environment. Hosted hardware 602 includes a data cache 604 as well as WAN optimization functionality 606; note that data cache 604 may be managed by or part of WAN optimization functionality 606. Consider a request to access a URL that is sent from enterprise 200 to hosted hardware 602 (operation 1). Hosted hardware can cache the request and any associated request information in data cache 604, and then forward the request to cloud system hardware 210 to be analyzed (operation 2). Note that cloud system hardware 210 also supports WAN optimization functionality 608, which may be executed in dispatcher VM 212 or operate externally from (but in conjunction with) dispatcher VM 212.

Security service VM 240 analyzes the request (operation 3) and dispatcher VM 212 outputs either a rejection of the request or an approved request. Now, however, instead of this request being sent directly to untrusted outside world 250, this request is returned to hosted hardware 602 (operation 4), which then sends the request out to the appropriate webserver in untrusted outside world 250 (operation 5). Hosted hardware 602 receives the response from the webserver (operation 6), and both caches the response in data cache 604 and forwards the response to dispatcher VM 212, which sends the data through the return path of security service VM 240 (operation 8). Now, however, instead of sending the response traffic back to hosted hardware 602, dispatcher VM 212 and/or WAN optimization functionality 608 instead sends only a compressed indicator (operation 9) of whether the analysis was favorable (i.e., the response can be sent back to enterprise 200) or rejected (i.e., the response cannot be sent back to enterprise). If the analysis was favorable, hosted hardware 602 sends its cached version of the response back to enterprise 200 (operation 10). Sending only the compressed indicator from cloud system hardware 210 instead of the full response allows the compute capabilities of the cloud computing environment to be leveraged without having to incur the higher outgoing network costs of the cloud computing environment for the majority of the response traffic. While such techniques will not necessarily eliminate 100% of the traffic output from the cloud system hardware 210, they can eliminate a majority of such traffic and thus provide substantial savings in network transfer costs.

Note that while dispatcher VM is illustrated to be in cloud system hardware 210 in FIG. 6, in some implementations some or all of the containers executing aspects of dispatching operations may execute in one or both of hosted hardware 602 and dispatcher VM 212. For instance, hosted hardware may also execute proxy, IPSec, and SOCKS containers to decode and operate upon incoming requests (and encode responses to enterprise 200), and then re-encode traffic that is sent on to cloud system hardware 210. Thus, some instances of the dispatcher functionality may be distributed across (or duplicated in) hosted hardware and dispatcher VM 212.

In the exemplary system of FIG. 6 (and similar related system organizations), new information is always coming into hosted hardware 602. Data that is then forwarded into the cloud computing environment will always be new information that needs to be analyzed, but the output of the security stack will either be old data (that is already stored in data cache 604) or a rejection from the security stack, allowing the security stack output to be optimized. For instance, WAN optimization functionality 608 could send to hosted hardware 602 a hash value that was computed for the valid security stack output; hosted hardware 602 could then use this hash value to determine which request the response is referring to, the set of data to forward from data cache 604, and the address in enterprise 200 to forward the data to. Note that WAN optimization can be performed for both outgoing and return traffic (e.g., for both information that was received from the enterprise and needs to be checked by the cloud security stack as well as information that was received from the untrusted outside world and needs to be checked by the cloud security stack). For instance, while in the above example of accessing a URL the initial request is typically small (e.g., a URL and a small amount of accompanying information) and the response can be quite large (e.g., a web page with many images, or a large file that is being downloaded), in other scenarios the initial request may be quite large (e.g., large files that are being uploaded or emailed), and hence the optimizations may be more beneficial for the initiate request than for the subsequent response (which might only be a simple acknowledgement that the upload was received).

In some embodiments, hosted hardware 602 may be able to further optimize data transfers to reduce request latency. For instance, hosted hardware 602 may be able to already send a request to the untrusted outside world 250 in parallel with sending the request to the cloud security stack, so that the requested data is already available in data cache 604 and ready to be forwarded on to the cloud-based security stack as soon as hosted hardware 602 receives the indication that the initial request was valid/authorized from the cloud-based security stack. However, while such optimizations may reduce some latency, they may also have some issues if the outgoing request is accessing dynamic content (e.g., content that changes based on the time of the access) or somehow violates timing (or other) rules in the cloud-based security stack.

Figure 11:
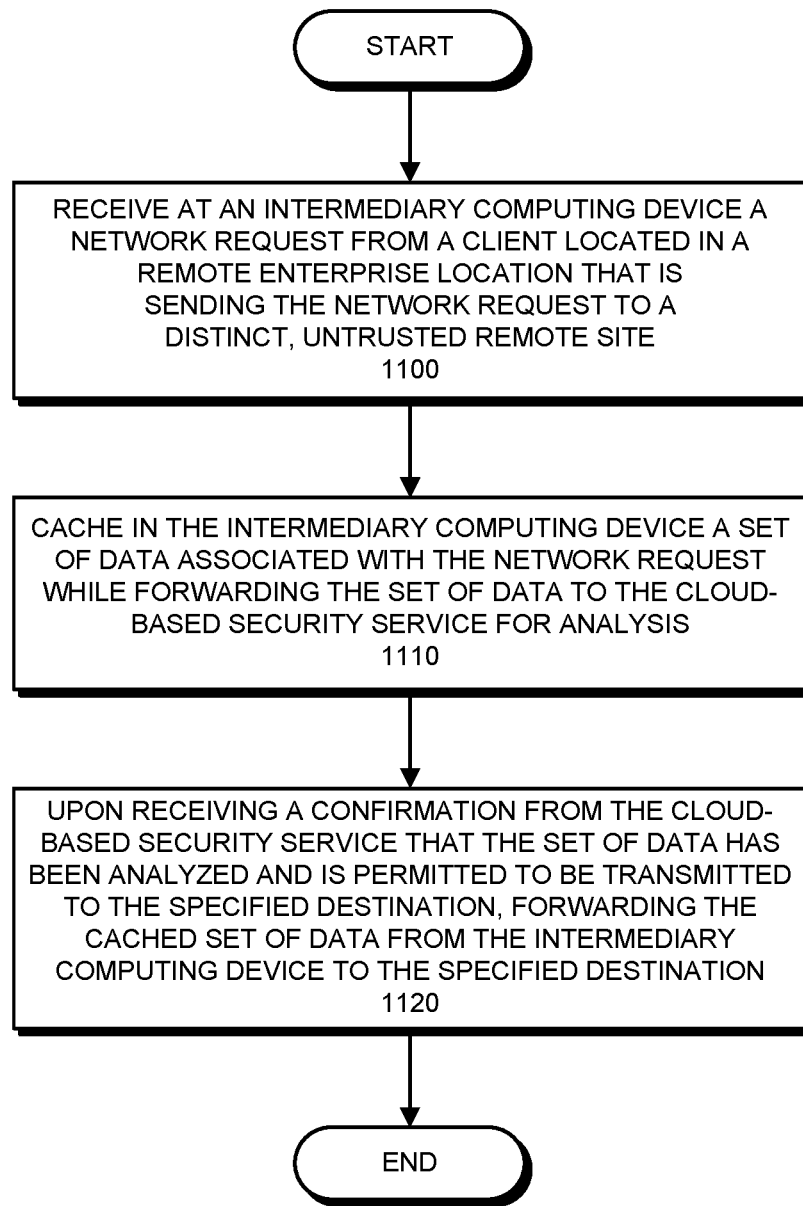
FIG. 11 presents a flow chart that illustrates the process of providing seamless service update for cloud-based security services in accordance with an embodiment.

FIG. 11 presents a flow chart that illustrates the process of providing seamless service update for cloud-based security services that execute in a cloud data center. During operation, an intermediary computing device receives a network request from a client located in a remote enterprise location that is sending the network request to a distinct, untrusted remote site (e.g., a site separate from the distinct locations of the remote enterprise, the cloud data center, and the intermediary computing device) (operation 1100). The intermediary computing device caches a set of data associated with the network request while forwarding the set of data to the cloud-based security service for analysis (operation 1110). Upon receiving a confirmation from the cloud-based security service that the set of data has been analyzed and is permitted to be transmitted to the specified destination, the intermediary computing device forwards the cached set of data to the specified destination (operation 1120).

Computing Environment

Figure 7:
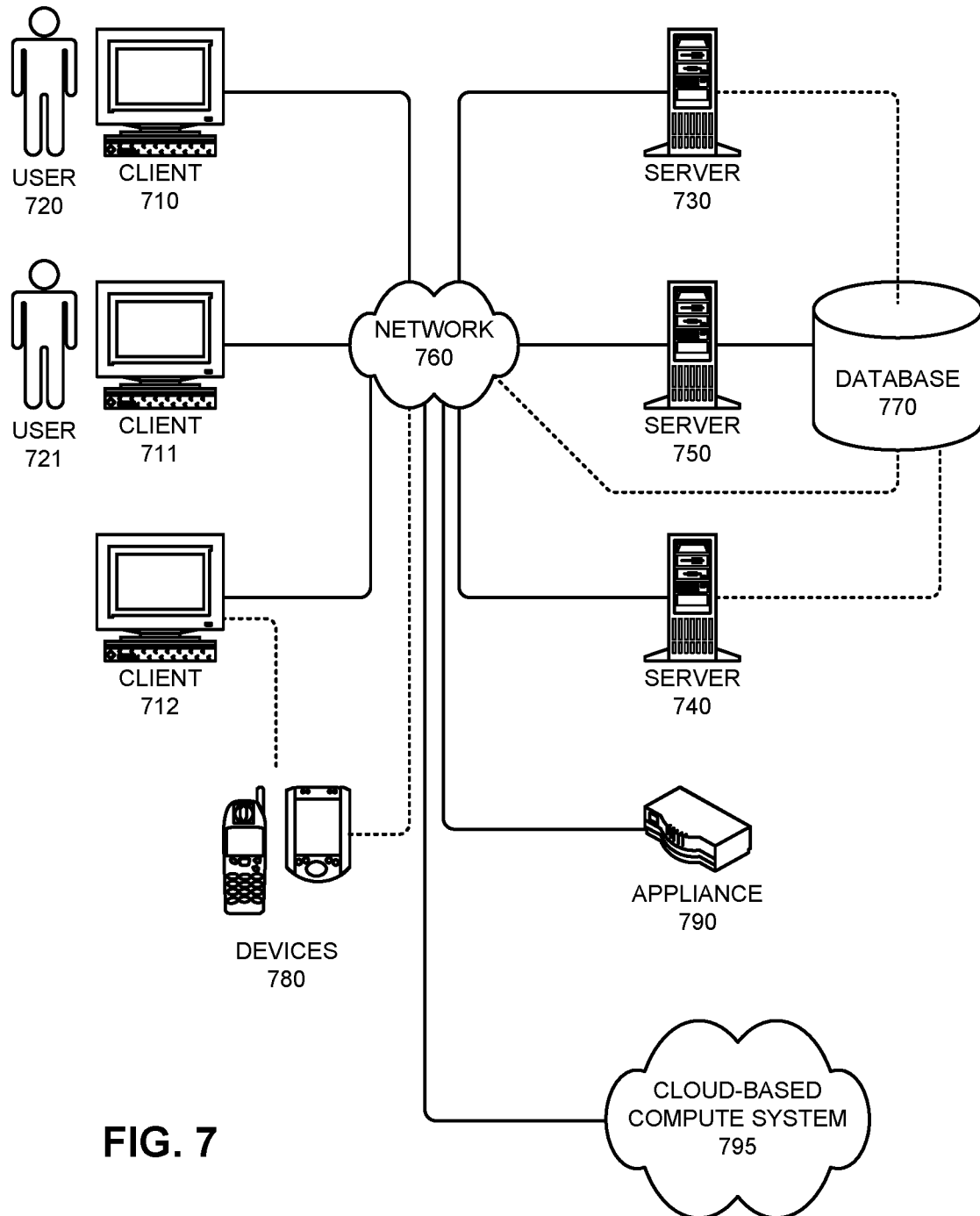
FIG. 7 illustrates a computing environment in accordance with an embodiment.

In summary, embodiments of the present invention facilitate providing, upgrading, and optimizing cloud-based security services. In some embodiments of the present invention, techniques for managing and/or accessing a cloud-based security stack can be incorporated into a wide range of computing devices in a computing environment. For example, FIG. 7 illustrates a computing environment 700 in accordance with an embodiment of the present invention. Computing environment 700 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 7, computing environment 700 includes clients 710-712, users 720 and 721, servers 730-750, network 760, database 770, devices 780, appliance 790, and cloud-based storage system 795.

Clients 710-712 can include any node on a network that includes computational capability and includes a mechanism for communicating across the network. Additionally, clients 710-712 may comprise a tier in an n-tier application architecture, wherein clients 710-712 perform as servers (servicing requests from lower tiers or users), and wherein clients 710-712 perform as clients (forwarding the requests to a higher tier).

Similarly, servers 730-750 can generally include any node on a network including a mechanism for servicing requests from a client for computational and/or data storage resources. Servers 730-750 can participate in an advanced computing cluster, or can act as stand-alone servers. For instance, computing environment 700 can include a large number of compute nodes that are organized into a computing cluster and/or server farm. In one embodiment of the present invention, server 740 is an online "hot spare" of server 750.

Users 720 and 721 can include: an individual; a group of individuals; an organization; a group of organizations; a computing system; a group of computing systems; or any other entity that can interact with computing environment 700.

Network 760 can include any type of wired or wireless communication channel capable of coupling together computing nodes. This includes, but is not limited to, a local area network, a wide area network, or a combination of networks. In one embodiment of the present invention, network 760 includes the Internet. In some embodiments of the present invention, network 760 includes phone and cellular phone networks.

Database 770 can include any type of system for storing data in non-volatile storage. This includes, but is not limited to, systems based upon magnetic, optical, or magneto-optical storage devices, as well as storage devices based on flash memory and/or battery-backed up memory. Note that database 770 can be coupled: to a server (such as server 750), to a client, or directly to a network. Alternatively, other entities in computing environment 700 (e.g., servers 730-450) may also store such data.

Devices 780 can include any type of electronic device that can be coupled to a client, such as client 712. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 780 can be coupled directly to network 760 and can function in the same manner as clients 710-712.

Appliance 790 can include any type of appliance that can be coupled to network 760. This includes, but is not limited to, routers, switches, load balancers, network accelerators, and specialty processors. Appliance 790 may act as a gateway, a proxy, or a translator between server 740 and network 760.

Cloud-based compute system 795 can include any type of networked compute devices (e.g., a federation of homogeneous or heterogeneous storage devices) that together provide compute and data storage capabilities to one or more servers and/or clients.

Note that different embodiments of the present invention may use different system configurations, and are not limited to the system configuration illustrated in computing environment 700. In general, any device that includes computational and storage capabilities may incorporate elements of the present invention.

Figure 8:
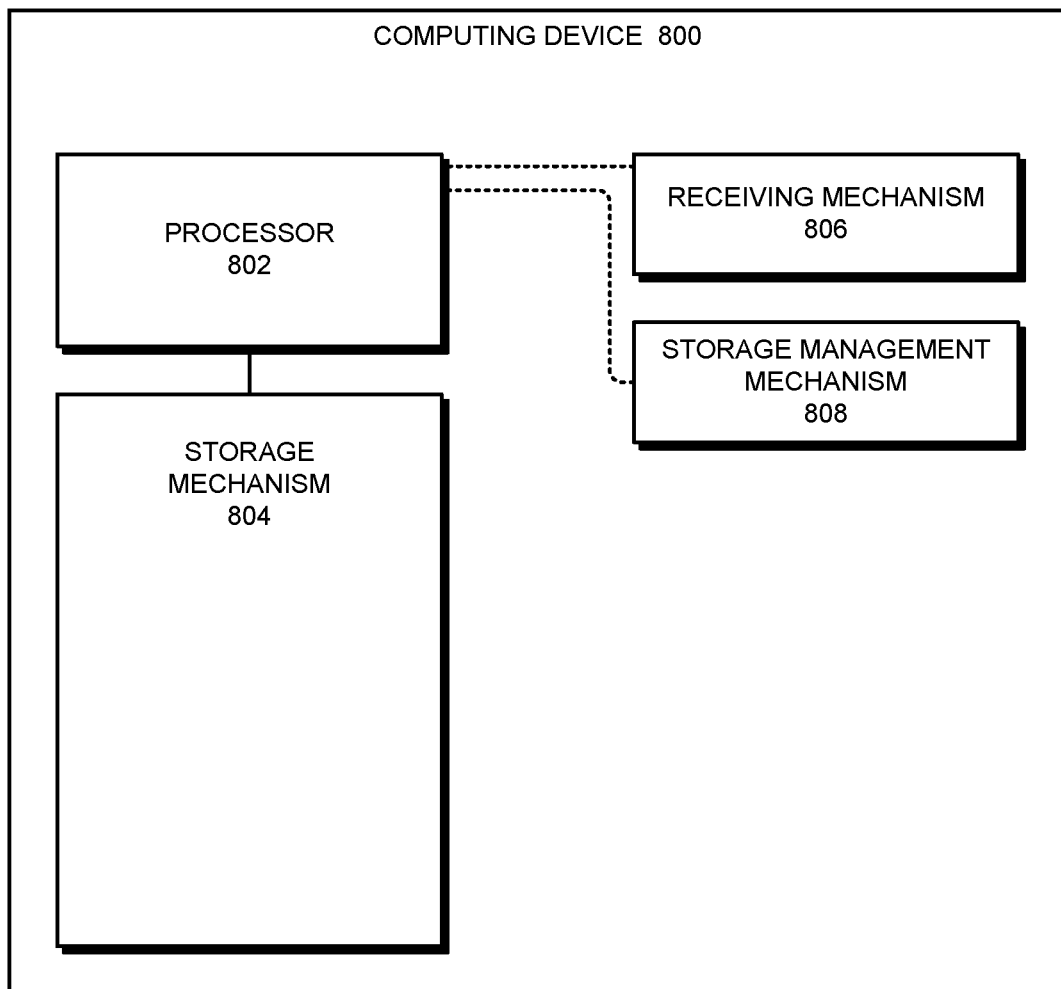
FIG. 8 illustrates a computing device in accordance with an embodiment.

FIG. 8 illustrates a computing device 800 that includes a processor 802 and a storage mechanism 804. Computing device 800 also includes a receiving mechanism 806 and a storage management mechanism 808.

In some embodiments, computing device 800 uses receiving mechanism 806, storage management mechanism 808, and storage mechanism 804 to perform functions that facilitate a cloud-based security stack. For instance, computing device 800 can use receiving mechanism 806 to receive a data to be analyzed by the cloud-based security stack and storage mechanism 804 to store data that is being operated upon by the security stack. Program instructions executing on processor 802 can analyze the received data, and storage management mechanism 808 ensure that the data being analyzed is routed and processes properly. Note that in many embodiments, processor 802 supports executing multiple different lightweight services in a single VM using docker containers.

In some embodiments of the present invention, some or all aspects of receiving mechanism 806, storage management mechanism 808, and/or a filesystem device driver can be implemented as dedicated hardware modules in computing device 800. These hardware modules can include, but are not limited to, processor chips, application-specific integrated circuit (ASIC) chips, field-programmable gate arrays (FPGAs), memory chips, and other programmable-logic devices now known or later developed.

Processor 802 can include one or more specialized circuits for performing the operations of the mechanisms. Alternatively, some or all of the operations of receiving mechanism 806, storage management mechanism 808, and/or a filesystem device driver may be performed using general-purpose circuits in processor 802 that are configured using processor instructions. Thus, while FIG. 8 illustrates receiving mechanism 806 and/or storage management mechanism 808 as being external to processor 802, in alternative embodiments some or all of these mechanisms can be internal to processor 508.

In these embodiments, when the external hardware modules are activated, the hardware modules perform the methods and processes included within the hardware modules. For example, in some embodiments of the present invention, the hardware module includes one or more dedicated circuits for performing the operations described above. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for optimizing data transfer costs for a cloud-based security service that executes in a cloud data center, the method comprising:

receiving at an intermediary computing device a network request from a client located in a remote enterprise location, wherein the client is sending the network request to an untrusted remote site that is external to the remote enterprise location and the cloud data center, wherein the intermediary computing device is external to the cloud data center;

caching at the intermediary computing device a set of data associated with the network request while forwarding the set of data to the cloud-based security service for analysis; and upon receiving at the intermediary computing device a confirmation from the cloud-based security service that the set of data has been analyzed and is permitted to be transmitted to a specified destination, forwarding the set of data from the intermediary computing device to the specified destination.

2. The computer-implemented method of claim 1, wherein executing the cloud-based security service in the cloud data center provides a scalable and flexible security stack for the enterprise;

wherein a cost model for the cloud data center specifies that sending data out of the cloud data center is substantially more expensive than receiving data into the cloud data center;

wherein the confirmation is much smaller in size than the set of data; and wherein sending the set of data from the intermediary computing device to the specified destination incurs substantially lower data transfer costs than sending the set of data from the cloud data center to the specified destination, thereby allowing the cloud-based security service to leverage the advantages of the computing capabilities of the cloud computing environment while reducing the data transfer costs associated sending data from the cloud computing environment.

3. The computer-implemented method of claim 2,
wherein the cloud-based security service comprises a dispatcher virtual machine (VM) that executes in the cloud data center, wherein the dispatcher VM manages the flow of network traffic through a chain of two or more security service VMs that execute in the cloud data center and analyze the contents of network traffic to and from the clients;
wherein each security service executes in its own separate VM;
wherein the security service VMs are chained together such that the network request is serially processed by each security service in the chain in a specified order;
wherein multiple docker containers execute as multi-tasking microservices within the dispatcher VM that execute in isolation of each other but can use operating system kernel resources to communicate with each other;
wherein each docker container is provided with an abstraction of its own process space and interfaces; and
wherein the financial cost of cloud-based services is directly proportional to the number of VMs used and executing microservices using dockers reduces the number of VMs needed to provide the cloud-based security service, thereby reducing the financial cost of providing the cloud-based security service.

4. The computer-implemented method of claim 3,
wherein the dispatcher VM determines from the output of the chain of security service VMs whether a traffic flow that is being analyzed by the chain of security service VMs has been allowed or denied passage; and
wherein the dispatcher VM is configured to notify the intermediary computing device of the results of the analysis so that the intermediary computing device can determine whether to forward the set of data to the specified destination or otherwise negatively flag the set of data.

5. The computer-implemented method of claim 4,
wherein the chain of security service VMs analyzes traffic flows and passes through traffic flows that have been determined to be valid unchanged;
wherein the chain of security service VMs flags and/or discards traffic flows that have been determined to be invalid; and
wherein the dispatcher VM is configured to compare the output of the chain of security service VMs for the traffic flow with the original traffic flow to determine whether the set of data should be forwarded to the specified destination.

6. The computer-implemented method of claim 5,
wherein the dispatcher VM returns a hash value for an allowed set of data to the intermediary computing device when indicating approval to the intermediary computing device;
wherein the dispatcher VM uses the hash value to confirm a match between the locally cached set of data and the allowed set of data and to ensure that only the allowed set of data is forwarded to the specified destination; and
wherein the channel of communication between the dispatcher VM and the intermediary computing device is protected to ensure that the intermediary computing device cannot be tricked by an external malicious party to send an unapproved set of data.

7. The computer-implemented method of claim 5,
wherein the cloud computing environment provides scalable, flexible, and highly reliable computing capabilities that can perform a wide range of analysis upon traffic flows;
wherein the intermediary computing device primarily caches and forwards traffic flows, and hence does not need the same level of scalability, flexibility, and reliability as the cloud computing environment and the cloud-based security service; and
wherein multiple, geographically-separated intermediary computing devices may be provisioned to provide access to the cloud-based security service.

8. The computer-implemented method of claim 7,
wherein the multiple security services comprise:
a firewall service;
an anti-virus service;
an anti-malware service;
an internet protocol filtering service;
an intrusion detection service;
a unified threat management service;
a spam detection service;
a packet filtering service;
an application-specific analysis service;
a data loss prevention service; and
a traffic flow analysis service.

9. The computer-implemented method of claim 5,
wherein data that is flowing both into and out of the remote enterprise location is analyzed by the cloud-based security service;
wherein the intermediary computing device is configured to cache ad forward all data that it receives from the remote enterprise location as well as all external data that it receives that is bound for the remote enterprise location to the cloud-based security service; and
wherein the intermediary computing device is configured to only forward in either direction cached data that has been approved by the cloud-based security service.

10. The computer-implemented method of claim 9,
wherein the network request is a URL that specifies data that the client is requesting from the untrusted remote site;
wherein the intermediary computing device caches the URL and forwards the URL to the cloud-based security service for analysis;
wherein the cloud-based security service analyzes and approves the URL, and the dispatcher VM forwards the confirmation to the intermediary computing device;
wherein the intermediary computing device forwards the URL to the specified destination of the untrusted remote site;
wherein upon receiving a set of return data associated with the URL from the untrusted remote site, the intermediary computing device caches the set of return data while forwarding the set of return data to the cloud-based security service for analysis; and
wherein upon receiving confirmation that the set of return data has been analyzed and approved by the cloud-based security service, the intermediary computing device forwards the cached return set of data to the client that sent the network request.

11. The computer-implemented method of claim 9,
wherein the network request is a large file that the client is sending to the untrusted remote site;
wherein the intermediary caches the large file and forwards the large file to the cloud-based security service for analysis;

wherein the cloud-based security service analyzes and approves the network request, and the dispatcher VM forwards the confirmation to the intermediary computing device;

wherein the intermediary computing device forwards the large file to the specified destination of the untrusted remote site;

wherein upon receiving a set of return data associated with the large file from the untrusted remote site, the intermediary computing device caches the set of return data while forwarding the set of return data to the cloud-based security service for analysis; and wherein upon receiving confirmation that the set of return data has been analyzed and approved by the cloud-based security service, the intermediary computing device forwards the cached return set of data to the client that sent the network request.

12. The computer-implemented method of claim 9, wherein the network request is sent from the client in response to an earlier network request that was sent by the untrusted remote site; and wherein the earlier network request and the network request are both cached by the intermediary computing device and analyzed by the cloud-based security service before being permitted to be sent to their respective destinations.

13. The computer-implemented method of claim 9, wherein the method further comprises:

optimizing data transfers to reduce request latency by already forwarding the set of data to the specified destination in parallel with forwarding the set of data to the cloud-based security service for analysis, thereby allowing the requested data to already be retrieved while the request is being checked;

caching a set of return data from the specified destination in the intermediary computing device; and upon receiving the confirmation of the network request, sending the cached set of return data from the intermediary computing device to the cloud-based security service for analysis;

wherein forwarding the set of data in parallel facilitates receiving and analyzing the network request and set of return data more quickly but is only safe when forwarding an unchecked initial set of data is not likely to represent a security threat or breach.

14. A non-transitory computer-readable storage medium storing instructions that when executed by a computer cause the computer to perform a method for optimizing data transfer costs for a cloud-based security service that executes in a cloud data center, the method comprising:

receiving at an intermediary computing device a network request from a client located in a remote enterprise location, wherein the client is sending the network request to an untrusted remote site that is external to the remote enterprise location and the cloud data center, wherein the intermediary computing device is external to the cloud data center;

caching at the intermediary computing device a set of data associated with the network request while forwarding the set of data to the cloud-based security service for analysis; and upon receiving at the intermediary computing device a confirmation from the cloud-based security service that the set of data has been analyzed and is permitted to be transmitted to a specified destination, forwarding the set of data from the intermediary computing device to the specified destination.

15. An intermediary computing device that optimizes data transfer costs for a cloud-based security service that executes in a cloud data center, comprising:

a processor that supports executing multiple different lightweight services in a single virtual machine using docker containers;

a storage mechanism; and a storage management mechanism;

wherein the processor is configured to receive a network request from a client located in a remote enterprise location, wherein the client is sending the network request to an untrusted remote site that is external to the remote enterprise location and the cloud data center, wherein the intermediary computing device is external to the cloud data center;

wherein the storage management mechanism is configured to cache in the storage mechanism a set of data associated with the network request while forwarding the set of data to the cloud-based security service for analysis; and wherein the storage management mechanism is further configured to, upon receiving a confirmation from the cloud-based security service that the set of data has been analyzed and is permitted to be transmitted to a specified destination, forward the set of data from the intermediary computing device to the specified destination.

* * * * *